(12) United States Patent
Valencia et al.

(10) Patent No.: US 9,330,257 B2
(45) Date of Patent: *May 3, 2016

(54) ADAPTIVE OBSERVATION OF BEHAVIORAL FEATURES ON A MOBILE DEVICE

(71) Applicant: QUALCOMM Incorporated, San Diego, CA (US)

(72) Inventors: Andres Valencia, San Jose, CA (US); Mastooreh Salajegheh, San Jose, CA (US); Vinay Sridhara, Santa Clara, CA (US); Mihai Christodorescu, San Jose, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,471

(22) Filed: Jun. 30, 2014

(65) Prior Publication Data

US 2014/0317734 A1   Oct. 23, 2014

Related U.S. Application Data

(63) Continuation-in-part of application No. 13/923,547, filed on Jun. 21, 2013.

(60) Provisional application No. 61/756,963, filed on Jan. 25, 2013, provisional application No. 61/683,274, filed on Aug. 15, 2012, provisional application No. 61/882,833, filed on Sep. 26, 2013, provisional application No. 61/971,322, filed on Mar. 27, 2014.

(51) Int. Cl.
*G06F 21/00* (2013.01)
*G06F 21/55* (2013.01)
*G06F 21/31* (2013.01)

(52) U.S. Cl.
CPC .......... *G06F 21/552* (2013.01); *G06F 21/316* (2013.01); *G06F 2221/2111* (2013.01)

(58) Field of Classification Search
CPC combination set(s) only.
See application file for complete search history.

(56) References Cited

U.S. PATENT DOCUMENTS 5,870,735 A   2/1999   Agrawal et al.
6,532,541 B1   3/2003   Chang et al.

(Continued)

FOREIGN PATENT DOCUMENTS

CN   102591696 A   7/2012
EP   1182552 A2   2/2002

(Continued)

OTHER PUBLICATIONS

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

(Continued)

*Primary Examiner* — Ghazal Shehni
(74) *Attorney, Agent, or Firm* — The Marbury Law Group, PLLC

(57) ABSTRACT

Methods, devices and systems for detecting suspicious or performance-degrading mobile device behaviors intelligently, dynamically, and/or adaptively determine computing device behaviors that are to be observed, the number of behaviors that are to be observed, and the level of detail or granularity at which the mobile device behaviors are to be observed. The various aspects efficiently identify suspicious or performance-degrading mobile device behaviors without requiring an excessive amount of processing, memory, or energy resources.

20 Claims, 20 Drawing Sheets

(56) References Cited

U.S. PATENT DOCUMENTS

| | | | |
|---|---|---|---|
| 6,643,802 B1 | 11/2003 | Frost et al. | |
| 7,051,327 B1 | 5/2006 | Milius et al. | |
| 7,401,359 B2 | 7/2008 | Gartside et al. | |
| 7,559,053 B2 | 7/2009 | Krassovsky et al. | |
| 7,561,877 B2 | 7/2009 | Cassett et al. | |
| 7,571,478 B2 | 8/2009 | Munson et al. | |
| 7,600,014 B2 | 10/2009 | Russell et al. | |
| 7,650,317 B2 | 1/2010 | Basu et al. | |
| 7,676,573 B2 | 3/2010 | Herzog et al. | |
| 7,694,150 B1 | 4/2010 | Kirby | |
| 7,757,292 B1 | 7/2010 | Renert et al. | |
| 7,774,599 B2 | 8/2010 | Guo et al. | |
| 7,831,237 B2 | 11/2010 | Passarella et al. | |
| 7,831,248 B2 | 11/2010 | Lee | |
| 7,849,360 B2 | 12/2010 | Largman et al. | |
| 7,877,621 B2 | 1/2011 | Jacoby et al. | |
| 7,881,291 B2 | 2/2011 | Grah | |
| 7,890,443 B2 | 2/2011 | Zhang et al. | |
| 7,945,955 B2 | 5/2011 | Katkar | |
| 8,045,958 B2 | 10/2011 | Kahandaliyanage | |
| 8,087,067 B2 | 12/2011 | Mahaffey et al. | |
| 8,095,964 B1 | 1/2012 | Zhong et al. | |
| 8,161,548 B1 | 4/2012 | Wan | |
| 8,201,244 B2 | 6/2012 | Sun et al. | |
| 8,201,249 B2 | 6/2012 | McCallam | |
| 8,225,093 B2 | 7/2012 | Fok | |
| 8,245,295 B2 | 8/2012 | Park et al. | |
| 8,245,315 B2 | 8/2012 | Cassett et al. | |
| 8,266,698 B1* | 9/2012 | Seshardi | G06F 21/53 726/22 |
| 8,311,956 B2 | 11/2012 | Sen et al. | |
| 8,312,545 B2 | 11/2012 | Tuvell et al. | |
| 8,321,941 B2 | 11/2012 | Tuvell et al. | |
| 8,331,987 B2 | 12/2012 | Rosenblatt | |
| 8,332,945 B2 | 12/2012 | Kim et al. | |
| 8,347,386 B2 | 1/2013 | Mahaffey et al. | |
| 8,397,301 B2 | 3/2013 | Hering et al. | |
| 8,443,439 B2 | 5/2013 | Lamastra et al. | |
| 8,456,809 B2 | 6/2013 | Kim et al. | |
| 8,516,584 B2 | 8/2013 | Moskovitch et al. | |
| 8,533,844 B2 | 9/2013 | Mahaffey et al. | |
| 8,554,912 B1 | 10/2013 | Reeves et al. | |
| 8,694,744 B1 | 4/2014 | Raj et al. | |
| 8,701,192 B1 | 4/2014 | Glick et al. | |
| 8,762,298 B1 | 6/2014 | Ranjan et al. | |
| 8,763,127 B2 | 6/2014 | Yao et al. | |
| 8,775,333 B1 | 7/2014 | Zahn | |
| 2002/0099756 A1 | 7/2002 | Catthoor et al. | |
| 2004/0039924 A1 | 2/2004 | Baldwin et al. | |
| 2004/0068721 A1 | 4/2004 | O'Neill et al. | |
| 2004/0083366 A1 | 4/2004 | Nachenberg et al. | |
| 2004/0221163 A1 | 11/2004 | Jorgensen et al. | |
| 2005/0144480 A1 | 6/2005 | Kim et al. | |
| 2006/0026464 A1 | 2/2006 | Atkin et al. | |
| 2006/0085854 A1 | 4/2006 | Agrawal et al. | |
| 2006/0288209 A1 | 12/2006 | Vogler | |
| 2007/0006304 A1 | 1/2007 | Kramer et al. | |
| 2007/0136455 A1 | 6/2007 | Lee et al. | |
| 2007/0192866 A1 | 8/2007 | Sagoo et al. | |
| 2007/0199060 A1 | 8/2007 | Touboul | |
| 2007/0220327 A1 | 9/2007 | Ruscio et al. | |
| 2007/0283170 A1 | 12/2007 | Yami et al. | |
| 2007/0287387 A1 | 12/2007 | Keum et al. | |
| 2007/0294768 A1 | 12/2007 | Moskovitch et al. | |
| 2008/0016339 A1 | 1/2008 | Shukla | |
| 2008/0026464 A1 | 1/2008 | Borenstein et al. | |
| 2008/0046755 A1 | 2/2008 | Hayes | |
| 2008/0047009 A1 | 2/2008 | Overcash et al. | |
| 2008/0086773 A1 | 4/2008 | Tuvell et al. | |
| 2008/0109495 A1 | 5/2008 | Herberger et al. | |
| 2008/0140821 A1 | 6/2008 | Tada | |
| 2008/0162686 A1 | 7/2008 | Kalaboukis et al. | |
| 2008/0163382 A1 | 7/2008 | Blue et al. | |
| 2008/0172746 A1 | 7/2008 | Lotter et al. | |
| 2008/0228429 A1 | 9/2008 | Huang et al. | |
| 2009/0019546 A1 | 1/2009 | Park et al. | |
| 2009/0019551 A1 | 1/2009 | Haga et al. | |
| 2009/0199296 A1 | 8/2009 | Xie et al. | |
| 2009/0217078 A1 | 8/2009 | Cassett et al. | |
| 2009/0239531 A1 | 9/2009 | Andreasen et al. | |
| 2009/0287618 A1 | 11/2009 | Weinberger et al. | |
| 2009/0288080 A1 | 11/2009 | Partridge | |
| 2009/0288164 A1 | 11/2009 | Adelstein et al. | |
| 2009/0300765 A1 | 12/2009 | Moskovitch et al. | |
| 2009/0327168 A1 | 12/2009 | Weinberger et al. | |
| 2010/0011029 A1 | 1/2010 | Niemelae | |
| 2010/0036786 A1 | 2/2010 | Pujara | |
| 2010/0082513 A1 | 4/2010 | Liu | |
| 2010/0105404 A1 | 4/2010 | Palanki et al. | |
| 2010/0107257 A1 | 4/2010 | Ollmann | |
| 2010/0128125 A1 | 5/2010 | Warzelhan | |
| 2010/0153371 A1 | 6/2010 | Singh | |
| 2010/0154032 A1 | 6/2010 | Ollmann | |
| 2010/0175135 A1 | 7/2010 | Kandek et al. | |
| 2010/0192201 A1 | 7/2010 | Shimoni et al. | |
| 2010/0241974 A1 | 9/2010 | Rubin et al. | |
| 2010/0251340 A1 | 9/2010 | Martin et al. | |
| 2010/0262693 A1 | 10/2010 | Stokes et al. | |
| 2010/0296496 A1 | 11/2010 | Sinha et al. | |
| 2010/0299292 A1 | 11/2010 | Collazo | |
| 2010/0313269 A1 | 12/2010 | Ye | |
| 2011/0004935 A1 | 1/2011 | Moffie et al. | |
| 2011/0013528 A1 | 1/2011 | Chen | |
| 2011/0023118 A1 | 1/2011 | Wright | |
| 2011/0060948 A1 | 3/2011 | Beebe | |
| 2011/0105096 A1 | 5/2011 | Dods et al. | |
| 2011/0145920 A1 | 6/2011 | Mahaffey et al. | |
| 2011/0161452 A1 | 6/2011 | Poornachandran et al. | |
| 2011/0219449 A1 | 9/2011 | St. Neitzel et al. | |
| 2011/0264764 A1 | 10/2011 | Kewalramani et al. | |
| 2011/0286437 A1 | 11/2011 | Austin et al. | |
| 2011/0302654 A1 | 12/2011 | Miettinen | |
| 2011/0302656 A1 | 12/2011 | El-Moussa | |
| 2011/0307233 A1 | 12/2011 | Tseng et al. | |
| 2012/0016633 A1 | 1/2012 | Wittenstein et al. | |
| 2012/0051228 A1 | 3/2012 | Shuman et al. | |
| 2012/0060219 A1 | 3/2012 | Larsson et al. | |
| 2012/0096539 A1 | 4/2012 | Hu et al. | |
| 2012/0110174 A1 | 5/2012 | Wootton et al. | |
| 2012/0131674 A1 | 5/2012 | Wittenschlaeger | |
| 2012/0151062 A1 | 6/2012 | Gusev et al. | |
| 2012/0159633 A1 | 6/2012 | Grachev et al. | |
| 2012/0167162 A1 | 6/2012 | Raleigh et al. | |
| 2012/0167217 A1 | 6/2012 | McReynolds | |
| 2012/0167218 A1 | 6/2012 | Poornachandran et al. | |
| 2012/0180126 A1 | 7/2012 | Liu et al. | |
| 2012/0207046 A1 | 8/2012 | Di Pietro et al. | |
| 2012/0210423 A1 | 8/2012 | Friedrichs et al. | |
| 2012/0227105 A1 | 9/2012 | Friedrichs et al. | |
| 2012/0233694 A1* | 9/2012 | Baliga et al. | 726/23 |
| 2012/0245481 A1 | 9/2012 | Blanco et al. | |
| 2012/0254333 A1 | 10/2012 | Chandramouli et al. | |
| 2012/0270611 A1 | 10/2012 | Choi et al. | |
| 2012/0311366 A1 | 12/2012 | Alsina et al. | |
| 2012/0311708 A1 | 12/2012 | Agarwal et al. | |
| 2012/0317306 A1 | 12/2012 | Radinsky et al. | |
| 2012/0321175 A1 | 12/2012 | Hedau et al. | |
| 2012/0323853 A1 | 12/2012 | Fries et al. | |
| 2013/0014262 A1 | 1/2013 | Lee et al. | |
| 2013/0031600 A1 | 1/2013 | Luna et al. | |
| 2013/0066815 A1 | 3/2013 | Oka et al. | |
| 2013/0073983 A1 | 3/2013 | Rasmussen et al. | |
| 2013/0097706 A1 | 4/2013 | Titonis et al. | |
| 2013/0151848 A1 | 6/2013 | Baumann et al. | |
| 2013/0167231 A1 | 6/2013 | Raman et al. | |
| 2013/0179991 A1 | 7/2013 | White et al. | |
| 2013/0203440 A1 | 8/2013 | Bilange et al. | |
| 2013/0204812 A1 | 8/2013 | Sterzing et al. | |
| 2013/0247187 A1 | 9/2013 | Hsiao et al. | |
| 2013/0267201 A1 | 10/2013 | Gupta et al. | |
| 2013/0303154 A1 | 11/2013 | Gupta et al. | |
| 2013/0303159 A1 | 11/2013 | Gathala et al. | |
| 2013/0304676 A1 | 11/2013 | Gupta et al. | |
| 2013/0304677 A1 | 11/2013 | Gupta et al. | |

(56) References Cited

U.S. PATENT DOCUMENTS

| | | | |
|---|---|---|---|
| 2013/0304869 | A1 | 11/2013 | Gupta et al. |
| 2013/0305101 | A1 | 11/2013 | Gupta et al. |
| 2013/0305358 | A1 | 11/2013 | Gathala et al. |
| 2013/0305359 | A1 | 11/2013 | Gathala et al. |
| 2014/0007183 | A1 | 1/2014 | Qureshi et al. |
| 2014/0051432 | A1 | 2/2014 | Gupta et al. |
| 2014/0053260 | A1 | 2/2014 | Gupta et al. |
| 2014/0053261 | A1 | 2/2014 | Gupta et al. |
| 2014/0096246 | A1 | 4/2014 | Morrissey et al. |
| 2014/0150100 | A1 | 5/2014 | Gupta et al. |
| 2014/0187177 | A1 | 7/2014 | Sridhara et al. |
| 2014/0188781 | A1 | 7/2014 | Fawaz |
| 2014/0205099 | A1 | 7/2014 | Christodorescu et al. |
| 2014/0237595 | A1 | 8/2014 | Sridhara et al. |
| 2014/0245306 | A1 | 8/2014 | Gathala |
| 2014/0279745 | A1 | 9/2014 | Esponda et al. |
| 2014/0337862 | A1 | 11/2014 | Valencia et al. |
| 2015/0148109 | A1 | 5/2015 | Gupta et al. |
| 2015/0356462 | A1 | 12/2015 | Fawaz et al. |

FOREIGN PATENT DOCUMENTS

| | | | |
|---|---|---|---|
| EP | 1983686 | A1 | 10/2008 |
| EP | 2182458 | A1 | 5/2010 |
| EP | 2326057 | A1 | 5/2011 |
| EP | 2406717 | A1 | 1/2012 |
| EP | 2680182 | A1 | 1/2014 |
| TW | 200937198 | A | 9/2009 |
| TW | 201239618 | A | 10/2012 |
| WO | 2010048502 | | 4/2010 |
| WO | 2010126416 | A1 | 11/2010 |
| WO | 2011147580 | A1 | 12/2011 |
| WO | 2013016692 | | 1/2013 |
| WO | 2013080096 | A1 | 6/2013 |
| WO | 2013172865 | A1 | 11/2013 |
| WO | 2013173003 | A2 | 11/2013 |
| WO | 2013173044 | A2 | 11/2013 |

OTHER PUBLICATIONS

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

Hu W., et al., "AdaBoost-Based Algorithm for Network Intrusion Detection," IEEE Transactions of Systems, Man, and Cybernetics, Part B: Cybernetics, Apr. 2008, vol. 38 (2), pp. 577-583.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW07), Nov. 5, 2007, pp. 516-520, XP031200055, DOI: 10.1109/WI-IATW.2007.52 the whole document.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.

Kirda E., et al., "Behavior-Based Spyware Detection", 15th USENIX Security Symposium, 2002, pp. 273-288.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Qin F., "System Support for Improving Software Dependability During Production Runs," Urbana, Illinois, 1998, pp. 1-116.

Schmidt A.D., et al., "Static analysis of executables for collaborative malware detection on android", Proceedings of the 2009 IEEE International Conference on Communications (ICC'09), Jun. 14, 2009, 3 Pages, XP031506460, DOI: 10.1109/ICC.2009.5199486 the whole document.

Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1] -paragraph [5.3.4].

Shabtai A., et al., "Dectecting unknown malicious code by applying classification techniques on OpCode patterns," Security Informatics a Springer Open Journal, 2012, vol. 1 (1), pp. 1-22.

Shabtai A., "Malware Detection on Mobile Devices," Eleventh International Conference on Mobile Data Management, IEEE Computer Society, 2010, pp. 289-290.

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Sheen S., et al., "Network Intrusion Detection using Feature Selection and Decision tree classifier," TENCON—IEEE Region 10 Conference, 2008, pp. 1-4.

Tabish S.M., "Maiware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.

Wang Y-M., et al., "Strider: A Black-Box, State-based Approach to Change and Configuration Management and Support," 2003 LISA XVII—Oct. 26-31, 2003—San Diego, CA, pp. 165-178.

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.

International Search Report and Written Opinion—PCT/US2013/078350—ISA/EPO—Oct. 29, 2014.

Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.

Gavin McWilliams: "Malware detection methods for fixed and mobile networks", Centre for Secure Information Technologies—Queen's University Belfast, Jan. 23, 2013, pp. 1-21, XP017577639, [retrieved on Jan. 23, 2013] the whole document.

Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/JarleKittilsen.pdf [retrieved on Dec. 14, 2012] the whole document.

Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-

(56) References Cited

OTHER PUBLICATIONS

445X, DOI: 10.1109/AINA.2013.88 ISBN: 978-1-4673-5550-6 [retrived on Jun. 13, 2013] the whole document.

Kolter J.Z., et al., "Learning to Detect Malicious Executables in the Wild", ACM Knowl. Discovery and Data Mining (KDD), 2004, pp. 470-478.

Kaspersky Endpoint Security 8 for Smartphone Program Version 8.0, Updated on Feb. 8, 2012.

Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.

Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.

Tan, P.N., et al., "Introduction to data mining," Library of Congress, 2006, Chapter 4.

Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9-12, 1999.

Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27-Aug. 1, 2008, pp. 160-165.

\* cited by examiner

ADAPTIVE OBSERVATION OF BEHAVIORAL FEATURES ON A MOBILE DEVICE

RELATED APPLICATIONS

This application is a continuation-in-part of U.S. patent application Ser. No. 13/923,547 entitled "Adaptive Observation of Behavioral Features on a Mobile Device" filed Jun. 21, 2013, which claims the benefit of priority to U.S. Provisional Application No. 61/756,963 entitled "Adaptive Observation of Behavioral Features on a Mobile Device" filed Jan. 25, 2013 and U.S. Provisional Application No. 61/683,274, entitled "System, Apparatus and Method for Adaptive Observation of Mobile Device Behavior" filed Aug. 15, 2012, the entire contents of all of which are hereby incorporated by reference for all purposes.

This application also claims the benefit of priority to U.S. Provisional Application No. 61/882,833, entitled "Adaptive Observation of Driver and Hardware Level Behavioral Features on a Mobile Device" filed Sep. 26, 2013, and to U.S. Provisional Application No. 61/971,322, entitled "Adaptive Observation of Behavioral Features on a Mobile Device" filed Mar. 27, 2014, the entire contents of which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena that can negatively impact a mobile device's long-term and continued performance and power utilization levels. Therefore, identifying and correcting the conditions and/or mobile device behaviors that may negatively impact the mobile device's long term and continued performance and power utilization levels is beneficial to consumers.

SUMMARY

The various aspects include methods, devices and systems for adaptive observations of behavior features of mobile devices in order to efficiently identify, prevent, and/or correct the conditions and/or mobile device behaviors that often degrade a mobile device's performance and/or power utilization levels over time. An aspect includes a method for observing mobile device behaviors over a period of time to recognize mobile device behaviors inconsistent with normal operation patterns. This aspect method may include dynamically selecting for observation one or more mobile device behaviors from the group mobile device operations, mobile device events, data network activity, system resource usage, mobile device state, inter-process communications, driver statistics, hardware component status, hardware counters, actions or operations of software Bluetooth device installation, Linux device applications, software downloads, changes to device or component settings, conditions and events at an application level, conditions and events at the radio level, and conditions and events at the sensor level, and adaptively observing the mobile device behaviors to identify a suspicious mobile device behavior from a limited set of observations.

In an aspect method, the mobile device operations may include one or more of library application programming interface (API) calls in an application framework or run-time library, system call APIs, file-system and networking subsystem operations, file system activity, searches for filenames, categories of file accesses, creating files, deleting files, file read/write/seek operations, and changing file permissions.

In an aspect method, the mobile device events may include one or more of device state changes and sensor devices state changes. In an aspect, data network activity may include one or more of types of connections, protocols, port numbers, server/client that the device is connected to, the number of connections, volume or frequency of communications, phone network activity, type and number of calls/messages sent, type and number of calls/messages received, type and number of calls/messages intercepted, call information, text messaging information, media messaging, user account information, transmissions, voicemail, and device identifiers.

In an aspect, the mobile device system resource usage may include one or more of monitoring the number of forks, memory access operations, and the number of files open. In an aspect method, the mobile device state may include one or more of display on/off state, locked/unlocked state, battery charge state, camera state, and microphone state.

In an aspect, the mobile device inter-process communications may include one or more of monitoring intents to crucial services, monitoring the degree of inter-process communications, and monitoring pop-up windows. In an aspect, driver statistics may include statistics from drivers for one or more of cameras, sensors, electronic displays, Wi-Fi® communication components, data controllers, memory controllers, system controllers, access ports, peripheral devices, wireless communication components, and external memory chips.

In an aspect, the mobile device hardware component status may include one or more of cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

In an aspect, the mobile device hardware counters may include one or more of hardware counters that denote the state or status of the mobile computing device and/or mobile device sub-systems, and special-purpose registers of processors/cores that are configured to store a count or state of hardware-related activities or events.

In an aspect, actions or operations of software applications may include monitoring of information used by software applications including one or more of location information, camera information, accelerometer information, inertia information (i.e., information from sensors that observe or detect movements of the mobile device such as data from an accelerometer, a gyroscope and/or an electronic compass), browser information, content of browser-based communications, content of voice-based communications, short range radio communications, content of text-based communications, content of recorded audio files, phonebook or contact information, contacts lists, calendar information, location information, recorded audio information, accelerometer information, notifications communicated to and from a software application, user verifications, and a user password.

In an aspect, software downloads may include one or more of software downloads from an application download server, and a first software application requesting the downloading and/or install of a second software application.

In an aspect, changes to device or component settings may include changes to one or more of compass information, mobile device settings, battery life, gyroscope information, pressure sensors, and screen activity.

In an aspect, conditions and events at the application level may include one or more of observing user via facial recognition software, observing social streams, observing notes entered by the user, observing event pertaining to use of an electronic payment service (such as PassBook®, Google Wallet, and PayPal®), observing events relating to use of virtual private networks, synchronization, voice searches, voice control, language translators, recognizing user gestures such as through camera images, touchscreen interactions, or sensors that track user hands or fingers in close proximity to the mobile device, offloading of data for computations, video streaming, camera usage without user activity, and microphone usage without user activity.

In an aspect, conditions and events at the radio level may include determining the presence, existence or amount of any or all of: user interaction with the mobile device before establishing radio communication links or transmitting information, multiple subscriber identity module cards, Internet radio, mobile phone tethering, offloading data for computations, device state communications, the use as a game controller or home controller, vehicle communications, mobile device synchronization, monitoring the use of radios (Wi-Fi, WiMax®, Bluetooth®, etc.) for positioning, peer-to-peer (p2p) communications, synchronization, vehicle to vehicle communications, and/or machine-to-machine (m2m), and monitoring network traffic usage, statistics, or profiles.

In an aspect, conditions and events at the events at the sensor level may include of one or more of monitoring magnet sensors, detecting near-field communications, collecting information from a credit card scanner, barcode scanner, or mobile tag reader, detecting the presence of universal serial bus (USB) power charging source, detecting that a keyboard or auxiliary device has been coupled to the mobile device, detecting that the mobile device has been coupled to a computing device (e.g., via USB, etc.), determining if a light emitting diode (LED), flash, flashlight, or light source has been modified or disabled (e.g., maliciously disabling an emergency signaling app, etc.), determining if a speaker or microphone has been turned on or powered, detecting a charging or power event, detecting that the mobile device is being used as a game controller, collecting information from medical purpose/healthcare sensors or from scanning the user's body, collecting information from an external sensor plugged into one of a USB port and an audio jack, collecting information from a tactile or haptic sensor, monitoring communications with and/or behaviors of hardware components coupled to the computing device via the USB or a wireless transceiver (e.g., Wi-Fi, Bluetooth, Near Field Communication (NFC), etc.), and collecting information pertaining to the thermal state of the mobile device.

In an aspect, dynamically selecting for observation one or more mobile device behaviors may include observing mobile device behaviors over the period of time, and identifying a limited set of behaviors associated with inconsistent operations as the mobile device behaviors to be observed.

In an aspect, identifying a limited set of behaviors associated with inconsistent operations as the mobile device behaviors to be observed may include receiving behavior inputs from one or more of a high-level application, a system kernel and a driver API after filtering by an adaptive filter, receiving context information regarding operations of the mobile device, performing spatial correlations of the received behavior inputs and the received context input, and generating a behavior vector.

In an aspect, generating a behavior vector may include generating a vector data structure that succinctly describes the observed mobile device behaviors. In an aspect, generating a behavior vector may include generating a vector that may include information collected from APIs at various levels/modules of the mobile device. In an aspect, generating a behavior vector may include generating a vector that may include information pertaining to one or more of library API calls, system calls, file-system and networking sub-system operations, sensor device state changes, file system activity, network activity, telephone activity, memory access operations, a state of the mobile device, a power on/off state of an electronic display of the mobile device, a locked/unlocked state the mobile device, an amount of battery power remaining, inter-process communications, driver statistics, and hardware counters.

In an aspect, generating a behavior vector may include generating a vector data structure that may include series of numbers, each of which signifies a feature or a behavior of the mobile device. In an aspect, at least one of the series of numbers identifies one or more of whether a camera of the mobile device is in use or not in use, how much network traffic has been generated by the mobile device, and how many internet messages have been sent from the mobile device.

In an aspect, generating a behavior vector may include generating a vector that may include at least one of call information, text messaging information, media messaging information, user account information, location information, camera information, accelerometer information, and browser information and inertia information. Inertia information may be information from sensors that observe or detect movements of the mobile device, such as data from an accelerometer, a gyroscope, an electronic compass, a camera in which images are processed to detect movements of the background, pressure sensors, Global Positioning System (GPS) receivers, and modules or services that can detect changes in position or movement from wireless signal from a cellular network (e.g., processing of signals to detect Doppler shift, changes in cell IDs, and device location information provided by the network) to name some non-limiting examples. In an aspect, generating a behavior vector may include generating a vector that may include information collected at an application level of the mobile device. In an aspect, generating a behavior vector may include generating a vector that may include information collected at a radio level of the mobile device. In an aspect, generating a behavior vector may include generating a vector that may include information collected at a sensor level of the mobile device.

In an aspect, identifying a limited set of behaviors associated with inconsistent operations as the mobile device behaviors to be observed further may include performing temporal correlations of the received behavior inputs and the received context input, wherein generating a behavior vector may include generating a behavior vector based on a result of the spatial and temporal correlations.

Further aspects may include methods of observing mobile device behaviors over a period of time to recognize mobile device behaviors inconsistent with normal operation patterns by determining in a processor of a mobile device a feature that is to be observed in the mobile device in order to identify a suspicious behavior of the mobile device, and adaptively observing the determined feature by collecting behavior information from a hardware component associated with the determined feature. In an aspect, adaptively observing the determined feature by collecting behavior information from the hardware component include collecting behavior information from one or more of: an inertia sensor component; a battery hardware component; a browser supporting hardware component; a camera hardware component; a single or dual subscriber identity module (SIM) hardware component; a location hardware component; a microphone hardware component; a radio interface hardware component; a speaker hardware component; a screen hardware component; a synchronization hardware component; a storage component; a universal serial bus hardware component; a user interaction hardware component (e.g., touchscreen, camera, near-surface; a battery hardware driver component; a browser supporting hardware driver component; a camera hardware driver component; a single or dual SIM hardware driver component; a location hardware driver component; a microphone hardware driver component; a radio interface hardware driver component; a speaker hardware driver component; a screen hardware driver component; a synchronization hardware driver component; a storage driver component; a universal serial bus hardware driver component; and a user interaction hardware driver component.

In an aspect, behavior information may be collected from multiple radio interface hardware components when the computing device includes multiple radio components to enable communications via multiple different radio frequency (RF) technologies and protocols. For example, behavior information may be collected from multiple radio interface hardware components each supporting one of cellular telephone (e.g., 3G, UMTS, CDMA, etc.), Wi-Fi, WiMax, NFC, personal area network, and Bluetooth communications. For ease of reference the different types of transceivers and modems supporting the different types of RF communications may be referred to collectively as simply radio interface hardware components.

In an aspect, behavior information may be collected from a single radio interface hardware component supporting multiple different RF technologies and protocols. For example, a computing device may include a multifunction radio module that is configured to support RF communications over multiple frequencies, networks and protocols, such a radio interface hardware component that enables communications via Wi-Fi, Bluetooth, NFC, and cellular data networks (e.g., GSM, WCDMA, etc.). In such implementations, the information regarding the RF communication behaviors (e.g., transmissions and receptions) of each of the various types of RF communications supported by the radio interface hardware component may be obtained from that single component. Thus, a single radio interface hardware component may be monitored for behaviors related to personal area networks, NFC links, and wide area networks.

In an aspect, user interactions may be received by a computing device in the form of gesture inputs, such as hand, arm, and/or finger gestures that are detected by an appropriate sensor (e.g., a camera, wireless position sensors on the use's wrists, touchscreens, and/or sensors that can detect the location of a user's fingers or hand in close proximity to the device).

In an aspect, collecting behavior information from the hardware component associated with the feature may include collecting information from a log of API calls that temporarily or permanently stores API call information for the access or use of the hardware component by software applications of the mobile device.

In an aspect, determining the feature that is to be observed in the mobile device to identify the suspicious behavior of the mobile device may include applying machine learning techniques to generate a first family of classifier models that describe a cloud corpus of behavior vectors, determining which factors in the first family of classifier models have the highest probably of enabling a mobile device to conclusively determine whether a mobile device behavior is malicious or benign, generating a second family of classifier models that identify significantly fewer factors and data points as being relevant for enabling the mobile device to conclusively determine whether the mobile device behavior is malicious or benign based on the determined factors, generating a mobile device classifier model based on the second family of classifier models, and using the generated classifier model to identify the feature that is to be observed. In an aspect, the method may further include using the generated classifier model to analyze the collected behavior information.

Further aspects may include a computing device having a multi-core processor including two or more processor cores, one or more of which is configured with processor-executable instructions to perform operations of the methods described above. A further aspect includes a mobile device having means for performing the functions and operations of the methods described above. A further aspect includes a non-transitory processor-readable storage medium having stored thereon processor-executable instructions configured to cause a processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
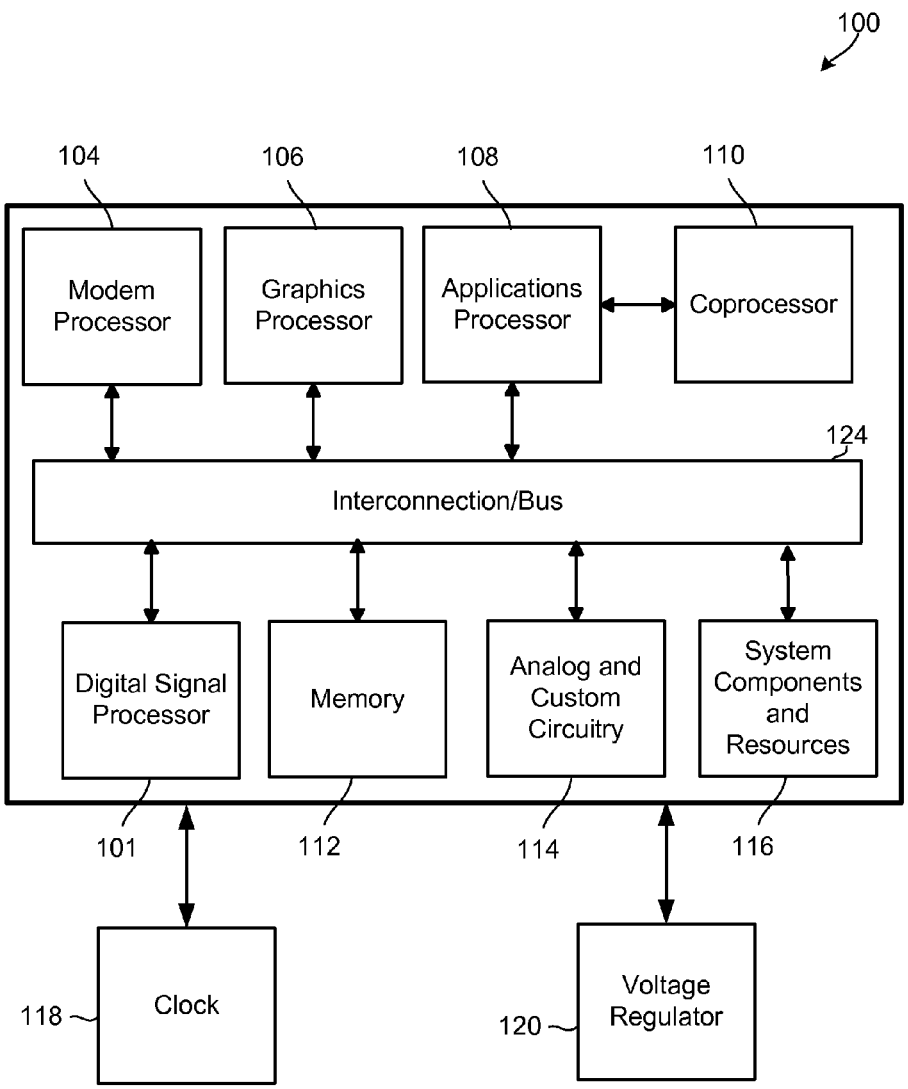
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "inertia sensor" component (i.e., a component that can provide inertia sensor information) may refer to any one or combination of sensors or modules that may observe or detect movements of the mobile device. Non-limiting examples of inertia sensor components include an accelerometer, a gyroscope, an electronic compass, a camera in which images are processed to detect movements of the background, pressure sensors, a GPS (or other satellite-based location system) receiver, and a module or service that can detect changes in position or movement from wireless signal from a cellular network (e.g., processing of signals to detect Doppler shift, changes in cell IDs, and device location information provided by the network).

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium Short Message Service (SMS) messages, etc.), denial of service (DoS), poorly written or designed software applications, malware, viruses, fragmented memory, operations relating to commandeering the mobile device or utilizing the phone for spying or botnet activities, etc.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. An SOC may include multiple multicore processors, and each processor in an SOC may be referred to as a core. The term "multiprocessor" is used herein to refer to a system or device that includes two or more processing units configured to read and execute program instructions.

Generally, the performance and power efficiency of a mobile device degrades over time. Recently, anti-virus companies (e.g., McAfee, Symantec, etc.) have begun marketing mobile anti-virus, firewall, and encryption products that aim to slow this degradation. However, many of these solutions rely on the periodic execution on the mobile device, of a computationally-intensive scanning engine that may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Various other solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of individual application programs or processes, and do not provide an accurate or complete model of the performance-degrading mobile device behaviors. For these and other reasons, existing modeling solutions are not adequate for identifying the numerous factors that may contribute to a mobile device's degradation over time, for preventing mobile device degradation, or for efficiently restoring an aging mobile device to its original condition.

There are a variety of factors that may contribute to the degradation in performance and power utilization levels of a mobile device over time, including poorly designed software applications, malware, viruses, fragmented memory, background processes, etc. However, due to the complexity of modern mobile devices, it is increasingly difficult for users, operating systems, and/or application programs (e.g., anti-virus software, etc.) to accurately and efficiently identify the sources of such problems and/or to provide adequate remedies to identified problems. As a result, mobile device users currently have few remedies for preventing the degradation in performance and power utilization levels of a mobile device over time, or for restoring an aging mobile device to its original performance and power utilization levels.

The various aspects provide devices, systems, and methods for efficiently identifying, preventing, and/or correcting the conditions and/or mobile device behaviors that often degrade a mobile device's performance and/or power utilization levels over time.

As mentioned above, mobile devices are resource constrained systems that have relatively limited processing, memory, and energy resources. As also mentioned above, modern mobile devices are complex systems, and there are a large number (i.e., thousands) of factors that may contribute to the mobile device's degradation over time. Due to these constraints, it is often not feasible to monitor/observe all the various processes, behaviors, or factors (or combinations thereof) that may degrade performance and/or power utilization levels of the complex yet resource-constrained systems of modern mobile devices.

To overcome the above mentioned limitations of existing solutions, the various aspects intelligently, dynamically, and/or adaptively determine mobile device behaviors that are to be observed, the number of behaviors that are to be observed, and the level of detail (i.e., granularity) at which the mobile device behaviors are to be observed. The various aspects efficiently identify suspicious or performance-degrading mobile device behaviors without consuming an excessive amount of processing, memory, or energy resources. Various aspects may correct suspicious or performance-degrading mobile device behaviors. Various aspects may prevent the identified suspicious or performance-degrading mobile device behaviors from degrading the performance and power utilization levels of a mobile device over time. Various aspects may restore an aging mobile device to its original performance and power utilization levels.

In an aspect, a mobile device processor may be configured to observe any or all of library application programming interface (API) calls, system call APIs, file-system operations, networking sub-system operations, driver API calls for the numerous sensors, state changes, and other similar events/operations at a high level, and perform real-time behavior analysis operations based on these high level observations to identify programs/processes that may contribute to the mobile device's degradation over time (e.g., programs that are actively malicious, poorly written, etc.). The mobile device processor may be configured to intelligently increase the level of detail (i.e., granularity) at which the mobile device behaviors are to be observed until enough information is available to identify and/or correct the cause of a suspicious or performance-degrading mobile device behavior.

In an aspect, the mobile device processor may be configured to dynamically change the set of observed behaviors (e.g., by selecting new behaviors to observe, observing fewer behaviors, etc.) based on the results of the on-line real-time analysis operations and/or the availability of system resources.

In various aspects, the mobile device processor may be configured to dynamically adjust the observation granularity (i.e., the level of detail at which mobile device behaviors are observed) based on the results of the real-time analysis operations and/or based on the availability of system resources. For example, in various aspects, the mobile device processor may be configured to recursively increase the granularity of one or more observations (i.e., make finer or more detailed observations) until a source of a suspicious or performance-degrading mobile device behavior is identified, until a processing threshold is reached, or until the mobile device processor determines that the source of the suspicious or performance-degrading mobile device behavior cannot be identified from further increases in observation granularity.

In an aspect, the mobile device processor may be configured to dynamically adjust the observation granularity based on the availability of system resources. For example, the mobile device processor may be configured to increase the observation granularity in response to determining that mobile device resources are available or underutilized or that the mobile is currently connected to a power supply. As another example, the mobile device processor may be configured to reduce the observation granularity in response to determining that the computing device is under heavy load or low battery.

Various aspects may include a comprehensive behavioral monitoring and analysis system for intelligently and efficiently identifying, preventing, and/or correcting the conditions, factors, and/or mobile device behaviors that often degrade a mobile device's performance and/or power utilization levels over time.

The behavioral monitoring and analysis system may include an observer process, daemon, module, or sub-system (herein collectively referred to as a "module") configured to instrument or coordinate various application programming interfaces (APIs), registers, counters or other mobile device components (herein collectively "instrumented components") at various levels of the mobile device system. The observer module may continuously (or near continuously) monitor mobile device behaviors by collecting behavior information from the instrumented components. The system may also include an analyzer module, and the observer module may communicate (e.g., via a memory write operation, function call, etc.) the collected behavior information to the analyzer module. The analyzer module may receive and use the behavior information to generate behavior vectors, generate spatial and/or temporal correlations based on the feature/behavior vectors, and use this information to determine whether a particular mobile device behavior, condition, sub-system, software application, or process is benign or not benign (e.g., suspicious, malicious, poorly designed, performance-degrading, etc.). The mobile device may then use the results of this analysis to heal, cure, isolate, or otherwise fix or respond to identified problems.

In the various embodiments, the observer module may be configured to monitor a wide variety of actions, operations, conditions, events, and behaviors of the mobile device, including accessing of call history information without prior user interaction; accessing a proximity sensor; CPU usage; memory usage; communicating voicemail information; applications bringing themselves into the foreground; applications bringing themselves into the foreground in combination with displaying a graphical user interface selected from the group a keyboard, a keypad and a signature block; USB communications; browser-based video, audio, file upload, or camera operations; battery usage while in the background; communication after reading shared data files; communication after reading information from a memory card; opening or closing a browser; writing or deleting browser info; writing or deleting contacts; deleting short message service (SMS) or multimedia messaging service (MMS) messages; accessing a motion coprocessor; interacting with power management systems; turning off an electronic display; patterns of CPU, memory, communication, and file access; pairing with a Bluetooth device; receiving near field communication (NFC) Multipurpose Internet Mail Extensions (MIME) type objects or communications; communicating via peer-to-peer (P2P)

NFC; sending NFC intents; installing widgets; installing shortcuts; accessing a Linux device; listening for a boot complete event; displaying invisible widgets, and any combination thereof.

The mobile device may monitor any or all of such actions, operations, conditions, events, and behaviors via the instrumented components to identify a software application or process that is potentially not benign (i.e., suspicious, malicious, performance degrading, etc.). For example, an operation of accessing call history information without prior user interaction may be indicative of suspicious activity because such information may be used by an unauthorized application to collect information about the user without the user's knowledge or consent. As such, the mobile device may monitor (e.g., via the observer module) the instrumented components to detect the access or use of the call history information. The mobile device may use this information to identify a software application or process that is potentially not benign (i.e., suspicious, malicious, performance degrading, etc.). The mobile device processor may then focus its operations on monitoring or analyzing the identified software application or process, such as by changing the features/behaviors that are observed or increasing the granularity of its observations (i.e., make finer or more detailed observations).

The analyzer module of the mobile device may be configured to perform real-time analysis operations, which may include applying data, algorithms, and/or behavior models to behavior information collected by the observer module to determine whether a mobile device behavior is benign, suspicious, or malicious/performance-degrading. In an aspect, the analyzer module may be configured to determine that a mobile device behavior is suspicious when the classifier does not have sufficient information to classify or conclusively determine that the behavior is either benign or malicious. In an aspect, the analyzer module may be configured to communicate the results of its real-time analysis operations to the observer module when it determines that a device behavior is suspicious. The observer module may adjust the granularity of its observations (i.e., the level of detail at which mobile device behaviors are observed) and/or change the behaviors that are observed based on information received from the analyzer module (e.g., results of the real-time analysis operations), generate or collect new or additional behavior information, and send the new/additional information to the classifier module for further analysis/classification.

Such feedback communications between the observer and analyzer modules (e.g., analyzer module sending the results of its real-time analysis operations to the observer module, and the observer module sending updated behavior information to the analyzer module) may enable a mobile device processor to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communications also enable the mobile device processor to adjust or modify the data/behavior models locally in the mobile device without consuming an excessive amount of the mobile device's processing, memory, or energy resources.

In various aspects, the observer module and/or analyzer module may generate behavior vectors that include a concise definition of the observed behaviors. That is, a behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the observer module and/or analyzer module may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many interne messages have been communicated (e.g., number of SMS messages, etc.), etc.

The mobile device may also monitor the access and use of a proximity sensor to identify a potentially non-benign (i.e., malicious, performance degrading, etc.) software application or process. For example, the mobile device may determine that an application that accesses the proximity sensor frequently, or transmits information immediately after accessing proximity sensor, requires additional or more detailed analysis or monitoring.

The mobile device may also monitor CPU usage to identify a potentially non-benign software application or process. For example, the mobile device may identify background processes that consume an excessive amount of the mobile device's CPU resources as requiring additional or more detailed monitoring or analysis.

The mobile device may also monitor the access and use of a memory to identify a potentially non-benign software application or process. For example, the mobile device may identify a software application that consume an excessive amount of the mobile device's memory resources as requiring additional or more detailed monitoring or analysis.

The mobile device may also monitor the access, use, or communication of voicemail information to identify a potentially non-benign software application or process. For example, the mobile device may flag a software application that communicates information after accessing voicemail information as requiring additional or more detailed monitoring or analysis.

The mobile device may also monitor the instrumented components to identify applications that move from the background to the foreground of the electronic display, particularly in combination applications that move from the background to the foreground of the electronic display to display a graphical user interface (GUI) selected from the group a keyboard, a keypad and a signature block as requiring additional or more detailed monitoring or analysis. For example, a malicious application may execute transparently or the background until another application is launched, then spoof the launched application's user interface by presenting its own GUI input (keyboard, keypad, signature block, etc.) to obtain the user's username and password information without that user's knowledge or consent. The mobile device may detect such conditions or operations, and flag the corresponding software application as potentially being non-benign.

The mobile device may also monitor USB communications to identify a potentially non-benign software application or process. For example, the mobile device may identify software applications that communicate information via the USB when the mobile device is charging as requiring additional or more detailed monitoring or analysis.

The mobile device may also monitor browser-based (e.g., HTML-based) video, audio, file upload, or camera operations to identify a potentially non-benign software application or process as requiring additional or more detailed monitoring or analysis.

The mobile device may also monitor battery usage while an application operates in the background state to identify a potentially non-benign software application or process. For example, the mobile device may identify background processes that consume an excessive amount of the mobile device's battery resources as requiring additional or more detailed monitoring or analysis.

The mobile device may also monitor communications after reading shared data files to identify a potentially non-benign software application or process that requires additional or more detailed monitoring or analysis.

The mobile device may also monitor communications after reading information from a memory card (e.g., an SD or FLASH memory card) to identify a potentially non-benign software application or process that requires additional or more detailed monitoring or analysis.

The mobile device may also monitor opening or closing a browser to identify a potentially non-benign software application or process that requires additional or more detailed monitoring or analysis. For example, the mobile device may identify a background application that opens and closes a browser as requiring additional or more detailed monitoring or analysis. As another example, the mobile device may identify a software application that opens and closes a browser user interaction as requiring additional or more detailed monitoring or analysis.

The mobile device may also monitor operations of writing or deleting browser information to identify a potentially non-benign software application or process that requires additional or more detailed monitoring or analysis. For example, the mobile device may identify a software application that communicates with a server and then deletes browsing history information as requiring additional or more detailed monitoring or analysis, because such actions may be indicative of malware attempting to cover its tracks.

The mobile device may also monitor operations of adding or removing of contacts to/from the mobile device's contacts list to identify a potentially non-benign software application or process that requires additional or more detailed monitoring or analysis. For example, the mobile device may identify a software application that adds a contact to the contact list without user interaction as requiring additional or more detailed monitoring or analysis.

The mobile device may also monitor deleting SMS or MMS messages to identify a potentially non-benign software application or process that requires additional or more detailed monitoring or analysis.

The mobile device may also monitor accessing a motion coprocessor to identify a potentially non-benign software application or process that requires additional or more detailed monitoring or analysis. The motion coprocessor may include various sensors, such as an accelerometer. The access and use of the motion coprocessor may be indicative of non-benign behavior. As such, the mobile device may flag software applications' access or use of the motion coprocessor as requiring additional or more detailed monitoring or analysis. In addition, the mobile device may identify the patterns of motion coprocessor usage by the application, and use this information to determine whether the identified patterns are inconsistent with normal usage patterns. For example, collecting behavior information from the instrumented component may include monitoring one or more of usage patterns of a processor, usage patterns of memory, usage patterns of the battery, usage patterns of a sensor, communication patterns, and file access patterns.

The mobile device may also monitor interactions with the high-level and low-level power management systems of the mobile device to identify a potentially non-benign software application or process that requires additional or more detailed monitoring or analysis. For example, the mobile device may flag user level software applications that access a low-level power management system of the mobile device (e.g., to power-off a core, etc.) as requiring additional or more detailed monitoring or analysis.

The mobile device may also monitor changes in the power state of its electronic display to identify a potentially non-benign software application or process that requires additional or more detailed monitoring or analysis. For example, the mobile device may flag a software application that powers off the display after exiting the idle state so its activity may not be observed by a user as requiring additional or more detailed monitoring or analysis.

The mobile device may also monitor patterns of CPU, memory, battery, sensor, communication, and file access to identify a potentially non-benign software application or process that requires additional or more detailed monitoring or analysis. For example, the mobile device may monitor the communication patterns a software application (or the device), and use this information to determine whether the identified patterns are inconsistent with normal communication patterns of similar software applications or the device.

The mobile device may also monitor pairing with a Bluetooth device to identify a potentially non-benign software application or process that requires additional or more detailed monitoring or analysis.

The mobile device may monitor NFC MIME types, objects or communications to identify a potentially non-benign software application or process that requires additional or more detailed monitoring or analysis.

The mobile device may also monitor communicating via peer-to-peer ("P2P") Near Field Communication (NFC) to identify a potentially non-benign software application or process that requires additional or more detailed monitoring or analysis.

The mobile device may also monitor sending an NFC intent to identify a potentially non-benign software application or process that requires additional or more detailed monitoring or analysis.

The mobile device may also monitor installation of widgets or operations of installing widgets to identify a potentially non-benign software application or process that requires additional or more detailed monitoring or analysis.

The mobile device may also monitor operations of installing shortcuts to identify a potentially non-benign software application or process that requires additional or more detailed monitoring or analysis.

The mobile device may also monitor operations of accessing Linux devices, which are basically virtual files that often link to hardware drivers on the mobile device, to identify a potentially non-benign software application or process that requires additional or more detailed monitoring or analysis.

The mobile device may also monitor operations of applications that are watching or listening for receipt of a boot complete event to identify a potentially non-benign software application or process that requires additional or more detailed monitoring or analysis. In particular, such monitoring operations may focus on applications that are waiting for or initiate an action in response to receiving a boot complete event.

The mobile device may also monitor displaying of invisible widgets to identify a potentially non-benign software application or process that requires additional or more detailed monitoring or analysis. In particular, this monitoring may watch for applications attempting to display an invisible widget.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector coprocessor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi, etc.), and other well known components (e.g., accelerometer, etc.) of modern electronic devices.

Figure 2:
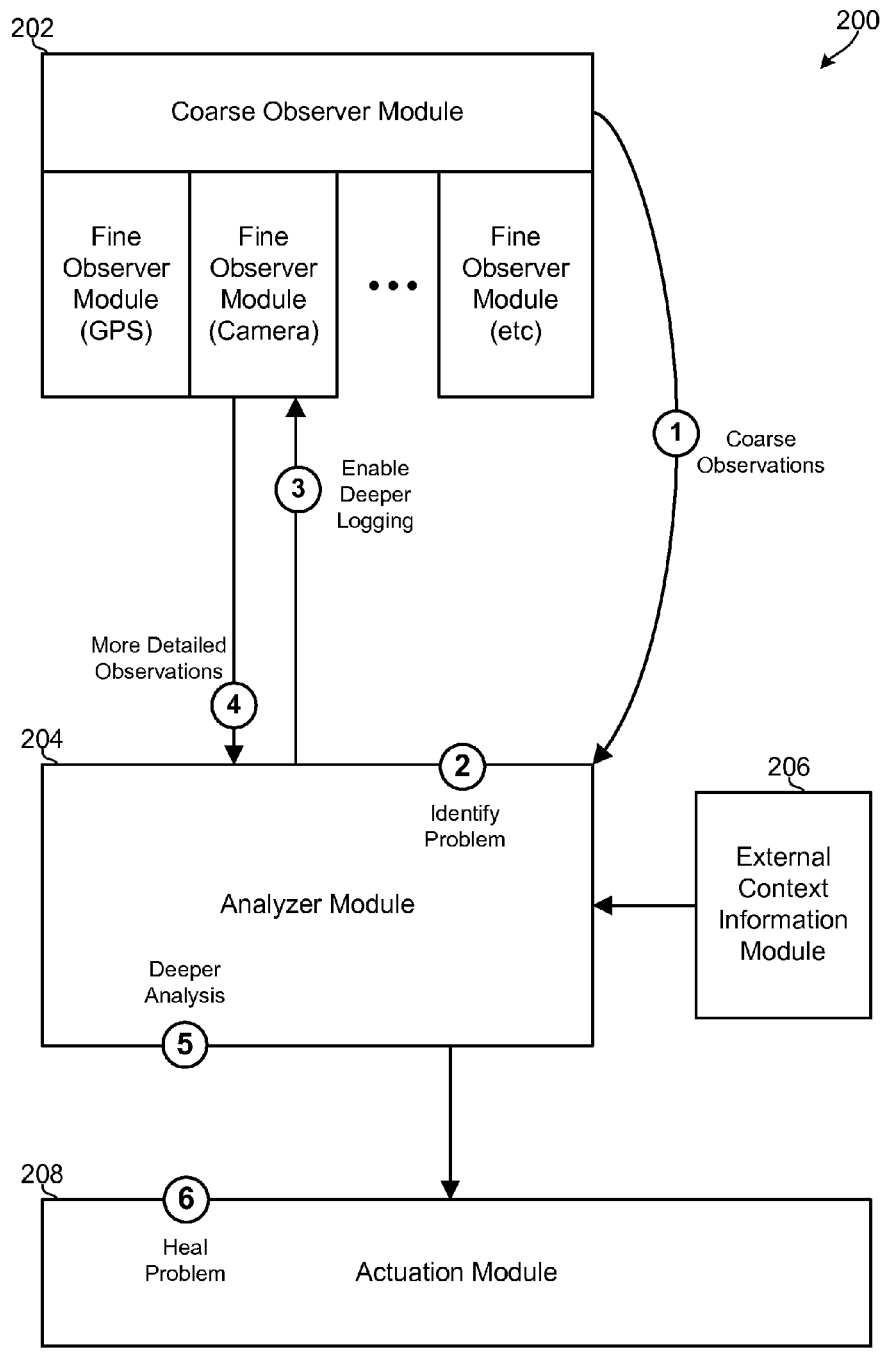
FIG. 2 is a block diagram illustrating example logical components and information flows in a computing system configured to perform dynamic and adaptive observations in accordance with the various aspects.

In addition to the SOC 100 discussed above, the various aspects may be implemented in a wide variety of computing systems, which may include a single processor, multiple processors, multicore processors, or any combination thereof FIG. 2 illustrates example logical components and information flows in a computing system 200 configured to perform dynamic and adaptive observations in accordance with the various aspects. In the example illustrated in FIG. 2, the computing system 200 includes a coarse observer module 202, an analyzer module 204, an external context information module 206, and an actuation module 208.

Each of the modules 202-208 may be implemented in software, hardware, or any combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of a mobile computing device (e.g., 102).

The behavior observer module 202 may be configured to instrument or coordinate APIs at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, Wi-Fi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The mobile device processor may be configured to observe conditions or events at multiple levels of the mobile device, including the application level, radio level, and sensor level. Application level observations may include observing the user via facial recognition software, observing social streams, observing notes entered by the user, observing events pertaining to use of an electronic payment service, such as PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual or multiple subscriber identity modules (SIM) or SIM cards, Internet radio, mobile phone tethering, offloading data for computations, device state communications, the use as a game controller or home controller, vehicle communications, mobile device synchronization, etc. Radio level observations may also include monitoring the use of radios (Wi-Fi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user). Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether a light emitting diode (LED), flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, monitoring communications with and/or behaviors of hardware components coupled to the computing device via the USB or a wireless transceiver (e.g., Wi-Fi, Bluetooth, or NFC), etc. Sensor level observations may also include collecting information from medical or healthcare sensors or from scanning the user's body, collecting information from an external sensor plugged into the USB/audio jack or coupled via a wireless data link (e.g., Wi-Fi, Bluetooth, or NFC), collecting information from a tactile or haptic sensor (e.g., via a vibrator interface, etc.), collecting information pertaining to the thermal state of the mobile device, etc.

The behavior observer module 202 may monitor/observe the accessing of call history information without prior user interaction; accessing a proximity sensor; CPU usage; memory usage; communicating voicemail information; applications bringing themselves into the foreground; applications bringing themselves into the foreground and presenting a keyboard; USB communications; browser-based video, audio, file upload, or camera operations; battery usage while in the background; communication after reading shared data files; communication after reading information from a memory card; opening or closing a browser; writing or deleting browser info; writing or deleting contacts; deleting short message service (SMS) or multimedia messaging service (MMS) messages; accessing a motion coprocessor; interacting with power management systems; turning off an electronic display; patterns of CPU, memory, communication, and file access; pairing with a Bluetooth device; receiving near field communication (NFC) Multipurpose Internet Mail Extensions (MIME) type objects or communications; communicating via peer-to-peer (P2P) NFC; sending NFC intents; installing widgets; installing shortcuts; accessing Linux devices; listening for a boot complete event; the displaying invisible widgets, and any combination thereof.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server and/or a component in a cloud service provider network. In an aspect, the initial set of behaviors/factors may be specified in data/behavior models received from the network server or cloud service provider network.

The analyzer module 204 may include intelligence for utilizing the limited set of information (i.e., coarse observations) to identify behaviors, processes, or programs that are contributing to (or are likely to contribute to) the device's degradation over time, or which may otherwise cause problems on the device. For example, the analyzer module 204 may be configured to analyze information (e.g., in the form of observations) collected from various modules (e.g., the observer module 202, external context information module 206, etc.), learn the normal operational behaviors of the mobile device, generate behavior models of the mobile device's behaviors, and compare the generated models to information/observations received from the observer module 202 to identify suspicious mobile device behaviors.

As mentioned above, the observer module 202 may monitor/observe mobile device operations and events. In various aspects, observing mobile device operations and events may include collecting information pertaining to any or all of library API calls in an application framework or run-time libraries, system call APIs, file-system and networking subsystem operations, device (including sensor devices) state changes, and other similar events. In an aspect, the observer module 202 may monitor file system activity, which may include searching for filenames, categories of file accesses (personal info or normal data files), creating or deleting files (e.g., type exe, zip, etc.), file read/write/seek operations, changing file permissions, etc. In an aspect, the observer module 202 may monitor data network activity, which may include types of connections, protocols, port numbers, server/client that the device is connected to, the number of connections, volume or frequency of communications, etc. In an aspect, the observer module 202 may monitor phone network activity, which may include monitoring the type and number of calls or messages (e.g., SMS, etc.) sent out, received, or intercepted (e.g., the number of premium calls placed). In an aspect, the observer module 202 may monitor the system resources that are used, which may include monitoring the number of forks, memory uses, number of files open, etc. In an aspect, the observer module 202 may monitor the device state, which may include monitoring various factors, such as whether the display is on or off, whether the device is locked or unlocked, the amount of battery remaining, the state of the camera, etc. In an aspect, the observer module 202 may also monitor inter-process communications (IPC) by, for example, monitoring intents to crucial services (browser, contracts provider, etc.), the degree of inter-process communications, pop-up windows, etc.

To reduce the number of factors monitored to a manageable level, the observer module 202 may perform coarse observations by monitoring/observing a small subset of the factors that could contribute to the mobile device's degradation, and send the coarse observations to the analyzer module 204. In an embodiment, the initial set of behaviors and/or subset of the factors may be selected by analysis of benign and problematic applications on mobile devices.

The analyzer module 204 may receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

The analyzer module 204 may instruct the observer module 202 to perform or enable deeper logging/observations or final logging on the identified subsystems, processes or applications. The observer module 202 may perform deeper observations on the identified subsystems, processes or applications. The observer module 202 may send the results of the deeper observations to the analyzer module 204 for further (and deeper) analysis. These operations may be repeated until the source of a problem is identified or until it is determined that the identified subsystems, processes or applications are not likely to cause problems or degradation. The analyzer module 204 may then send the results of the analysis to the actuation module 208, which may receive the results and perform operations to heal, cure, isolate, or otherwise fix the identified problem.

In an aspect, the observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the computing system 200 to efficiently identify and prevent problems from occurring on mobile devices without requiring a large amount of processor, memory, or battery resources on the device.

In an aspect, the observer module 202 may store the observations in a space efficient and query-service-time efficient manner to reduce the performance-impact on benign applications. The observer module 202 may provide the system with various observer modes to enable multi-level logging (e.g., fine grained and coarse-grained logging). The observer module 202 may provide the ability to automatically and dynamically switch between the different observer modes. The observer module 202 may monitor and restrict process/application that may exhaust system resources. The observer module 202 may manage communications (e.g., non-secure to secure world) overhead, such that the overhead is minimal and flow control is maintained/performed efficiently.

In an aspect, the analyzer module 204 may be configured to receive and analyze information collected by various mobile device sub-systems and/or over various time periods to learn the normal operational behaviors of the mobile device under a variety of contexts and conditions, and generate models of normal mobile device behaviors under the various contexts/conditions. In an aspect, the analyzer module 204 may be configured to correlate the received observations against the generated behavior models, and perform behavior analysis operations based on the correlations to determine whether the received observations conflict with (or do not match) the learned normal operational behaviors.

In various aspects, the mobile device may be configured to communicate with a network server, which may generate data/behavior models based on information received from a cloud service network server. The network server may send the generated data/behavior models to the mobile device, which may receive and implement, apply, or use lean data/behavior models to identify suspicious or performance-degrading mobile device behaviors, software applications, processes, etc. The mobile device may then correct or prevent the identified performance-degrading mobile device behaviors from degrading the performance and power utilization levels of the mobile device.

In various aspects, the network server may be configured to generate or update the data/behavior models by performing, executing, and/or applying machine learning and/or context modeling techniques to behavior information and/or results of behavior analyses provided by many mobile devices. Thus, the network server may receive a large number of reports from many mobile devices and analyze, consolidate or otherwise turn such crowd-sourced information into useable information, particularly a data set or behavior model that can be used and/or accessed by many mobile devices. The network server may continuously reevaluate existing data/behavior models as new behavior/analysis reports are received from mobile devices, and/or generate new or updated data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

As mentioned above, mobile devices are resource constrained systems that have relatively limited processing, memory, and energy resources. As also mentioned above, modern mobile devices are complex systems, and there may be thousands of features/factors and billions of datapoints that require analysis to properly identify the cause or source of a mobile device's degradation. Due to these constraints, it is often not feasible to monitor/observe all the various processes, behaviors, or factors (or combinations thereof) that may degrade performance and/or power utilization levels of the complex yet resource-constrained systems of modern mobile devices.

To provide better performance in view of these facts, the various aspects include mobile devices and network servers configured to work in conjunction with a cloud service or network (e.g., anti-virus partner, security partner, etc.) to intelligently and efficiently identify factors that may contribute to the degradation in performance and power utilization levels of mobile devices over time. Various aspects may identify performance-degrading factors on the mobile device without consuming an excessive amount of processing, memory, or energy resources of the mobile device.

In an aspect, the analyzer module 204 module may be configured to generate one or more classifiers as a function of a training dataset, which may include thousands of features and billions of entries. In an aspect, one or more classifiers may be generated from a reduced training dataset that includes only the features/entries that are most relevant for determining whether a particular mobile device behavior, software application, or process is benign, suspicious, or malicious/performance-degrading.

In an aspect, the analyzer module 204 of the mobile device may be configured to perform real-time analysis operations, which may include applying data, algorithms, and/or behavior models to behavior information collected by the observer module to determine whether a mobile device behavior is benign, suspicious, or malicious/performance-degrading.

The analyzer module 204 may determine that a mobile device behavior is suspicious when it does not have sufficient information to classify or conclusively determine that the behavior is either benign or malicious.

In an aspect, the analyzer module 204 of the mobile device may be configured to communicate the results of its real-time analysis operations to the observer module when the analyzer module 204 determines that a device behavior is suspicious. The observer module 202 may adjust the granularity of its observations (i.e., the level of detail at which mobile device behaviors are observed) and/or change the behaviors that are observed based on information received from the classifier module (e.g., results of the real-time analysis operations), generate or collect new or additional behavior information, and send the new/additional information to the classifier module for further analysis/classification.

Such feedback communications between the observer and classifier modules (e.g., classifier module sending the results of its real-time analysis operations to the observer module, and the observer module sending updated behavior information to the classifier module) may enable a mobile device processor to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device processor to adjust or modify the data/behavior models locally in the mobile device without consuming an excessive amount of the mobile device's processing, memory, or energy resources.

In various aspects, the mobile device may be configured to communicate with a network server that includes an offline classifier and/or a real-time online classifier. The offline classifier may generate robust data/behavior models based on information received from a cloud service/network. The real-time online classifier may generate lean data/behavior models based on analyzing the larger and more complicated behavior models generated from information received from the cloud service/network. Both the online and offline classifiers may generate data/behavior models that include a reduced subset of information made available by the cloud service/network for a particular mobile device. In an aspect, generating the lean data/behavior models may include generating one or more reduced feature models (RFMs).

The network server may send the generated lean data/behavior models to the mobile device. The mobile device may receive and implement, apply, or use lean data/behavior models to identify suspicious or performance-degrading mobile device behaviors, software applications, processes, etc. Since the lean data/behavior models include a reduced subset of the relevant information made available by the cloud service/network, the mobile device may use the lean data/behavior models to determine whether a mobile device behavior is malicious/performance-degrading or benign without consuming an excessive amount of processing, memory, or energy resources of the mobile device. The mobile device may then correct or prevent the identified performance-degrading mobile device behaviors from degrading the performance and power utilization levels of the mobile device.

In various aspects, the network server may be configured to generate or update the lean data/behavior models by performing, executing, and/or applying machine learning and/or context modeling techniques to behavior information and/or results of behavior analyses provided by many mobile devices. Thus, the network server may receive a large number of reports from many mobile devices and analyze, consolidate or otherwise turn such crowd-sourced information into useable information, particularly a lean data set or focused behavior models that can be used or accessed by all mobile devices. The network server may continuously reevaluate existing lean data/behavior models as new behavior/analysis reports are received from mobile devices, and/or generate new or updated lean data/behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the network server may be configured to generate lean data/behavior models that include an initial feature set (e.g., an initial reduced feature model) and one or more subsequent feature sets (e.g., subsequent reduced feature models). The initial feature set may include information determined to have a highest probably of enabling the classifier module of the mobile devices to conclusively determine whether a particular mobile device behavior, software application, or process is malicious/performance-degrading or benign. Each subsequent feature set may include information determined to have the next highest probably of conclusively determining that the mobile device behavior, software application, or process is malicious/performance-degrading or benign. Each subsequent feature set may include a larger dataset than its preceding feature set, and thus the performance and power consumption costs associated with applying the data/behavior models may increase progressively for each subsequent feature set.

In an aspect, the analyzer module 204 may include a classifier module that implements progressive behavior models (or classifiers) that enable the mobile device processor to evaluate the mobile device behaviors in stages. For example, the classifier module may be configured to first apply a lean data/behavior model that includes the initial feature set, then model that include progressively larger feature sets until the classifier module determines that a mobile device behavior is benign or malicious/performance-degrading. The classifier module may then send the results of its operations and/or success rates associated with the application of each model to the network server. The network server may use such results to update the lean data/behavior models (e.g., the features sets included in each model, etc.), thereby refining the data and/or models based on the results/success rates of all reporting mobile devices. The network server may then make the updated lean data/behavior models available to mobile devices so they have access to the lean data/behavior models. In this manner, mobile devices can instantly benefit from the behaviors and conclusions of other mobile devices.

In an aspect, the network server may be configured to continuously update the online and offline classifiers, model generators, and/or cloud model. The network server may be configured to intelligently determine when the changes are substantial enough to warrant generating new models and when the changes may be ignored. For example, the network server may receive updates from many different mobile devices, perform machine learning operations to generate a first family of classifiers, determine whether there are enough changes to the generated first family of classifiers to warrant generating new models, determine which features in the generated first family of classifiers are the best features when it is determined that there are enough changes to the first family of classifiers, generate a second family of classifiers based on the best features, determine whether there are enough changes to the generated second family of classifiers, and generate/update mobile device classifier data/behavior models when it is determined that there are enough changes to the second family of classifiers.

In an aspect, the analyzer module 204 may be configured to perform real-time behavior analysis operations, which may include performing, executing, and/or applying data, algorithms, classifiers or behavior models (collectively "classifier models") to behavior vectors or the collected behavior information.

Each behavior vector may encapsulate one or more "behavior features." Each behavior feature may be an abstract number that represents all or a portion of an observed behavior. The behavior features may be agnostic to the hardware or software configuration of the mobile device. Each behavior feature may be associated with a data type that identifies a range of possible values, operations that may be performed on those values, meanings of the values, etc. The data type may be used by the mobile device to determine how the feature (or feature value) should be measured, analyzed, weighted, or used.

Each classifier model may be a behavior model that includes data and/or information structures (e.g., feature vectors, behavior vectors, component lists, etc.) that may be used by a mobile device processor to evaluate a specific feature or aspect of a mobile device's behavior. Each classifier model may also include decision criteria for monitoring a number of features, factors, data points, entries, APIs, states, conditions, behaviors, applications, processes, operations, components, etc. (herein collectively "features") in the mobile device. The classifier models may be preinstalled on the mobile device, downloaded or received from a network server, generated in the mobile device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes only the features/entries that are most relevant for determining whether a particular mobile device behavior is benign or not benign (e.g., malicious or performance-degrading).

As mentioned above, various aspects may include mobile devices and network servers configured to work in conjunction with one another to intelligently and efficiently identify the features, factors, and data points that are most relevant to determining whether a mobile device behavior is benign or not benign (e.g., malicious or performance-degrading). In various aspects, the network server may be configured to receive a large amount of information regarding mobile device behaviors and states, features, and conditions during or characterizing those behaviors from a cloud service/network. This information may be in the form of a very large cloud corpus of mobile device behavior vectors. The network server may use this information to generate a full classifier model (i.e., a robust data/behavior model) that accurately describes the very large cloud corpus of behavior vectors. The network server may generate the full classifier model to include all or most of the features, data points, and/or factors that could contribute to the degradation over time of any of a number of different mobile devices.

In an aspect, the network server may generate the full classifier model to include a finite state machine expression or representation, such as a decision node or family of decision nodes. This finite state machine expression or representation can be quickly and efficiently culled, modified or converted into lean classifier models that are suitable for use or execution in a mobile device through application of culling algorithms at the mobile device processor. The finite state machine expression or representation may be an information structure that includes test conditions, state information, state-transition rules, and other similar information. In an aspect, the finite state machine expression or representation may be an information structure that includes a large or robust family of decision nodes that each evaluate or test a condition, feature, factor, or aspect of a behavior of the mobile device.

The mobile device may be configured to receive a full classifier model from the network server, and use the received full classifier model to generate lean classifier models (i.e., data/behavior models) locally in the mobile device. The mobile device may generate these local lean classifier models by culling a set of decision nodes included in the received full classifier model into to a subset of decision nodes that identify, test, evaluate and/or depend upon a reduced or limited number of different mobile device states, features, behaviors, or conditions. This culling of the full set of decision nodes may be accomplished by: selecting a decision node; identifying all other decision nodes that depend upon the same mobile device state, feature, behavior, or condition as the selected decision node (and thus can be applied based upon one determination result); including in the lean classifier model the selected and all identified other decision nodes that depend upon the same mobile device state, feature, behavior, or condition; and repeating the process for a reduced/limited number of selected decision nodes not already included in the lean classifier model. By repeating the process using different numbers of mobile device states, features, behaviors, or conditions that are tested, a family of lean classifier models may be generated with varying degrees of leanness determined by the number of states, features, behaviors, or conditions that are evaluated. In addition, each of these lean classifier models may test or evaluate some or all of the same features or conditions as another lean classifier model, but using different threshold values and/or different weights assigned to the importance of the test results, features, or conditions evaluated. As such, the process of generating or regenerating the lean classifier models may include re-computing the threshold values and/or weights associated with the decision nodes.

Since these lean classifier models include a reduced subset of states, features, behaviors, or conditions that must be tested (compared to the full classifier model), the observer and/or analyzer modules may use them to quickly and accurately determine whether a mobile device behavior is benign or contributing to the degradation in the performance of the mobile device without consuming an excessive amount of processing, memory, or energy resources of the mobile device. As noted above, the leanest of the family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the mobile device may be configured to generate one or more lean classifier models by converting a finite state machine representation/expression into decision nodes, culling the full set of decision nodes included in the full classifier model to a subset or subsets of decision nodes that depend upon a limited number of different mobile device states, features, behaviors, or conditions, and using the subset or subsets of decision nodes to intelligently monitor, analyze and/or classify a mobile device behavior. The use of decision nodes allows the observer and/or analyzer modules to generate and apply lean data models without communicating with the cloud or a network to retrain the data, which significantly reduces the mobile device's dependence on the network server and the cloud. This eliminates the feedback communications between the mobile device and the network server, which further improves the performance and power consumption characteristics of the mobile device.

Figure 3:
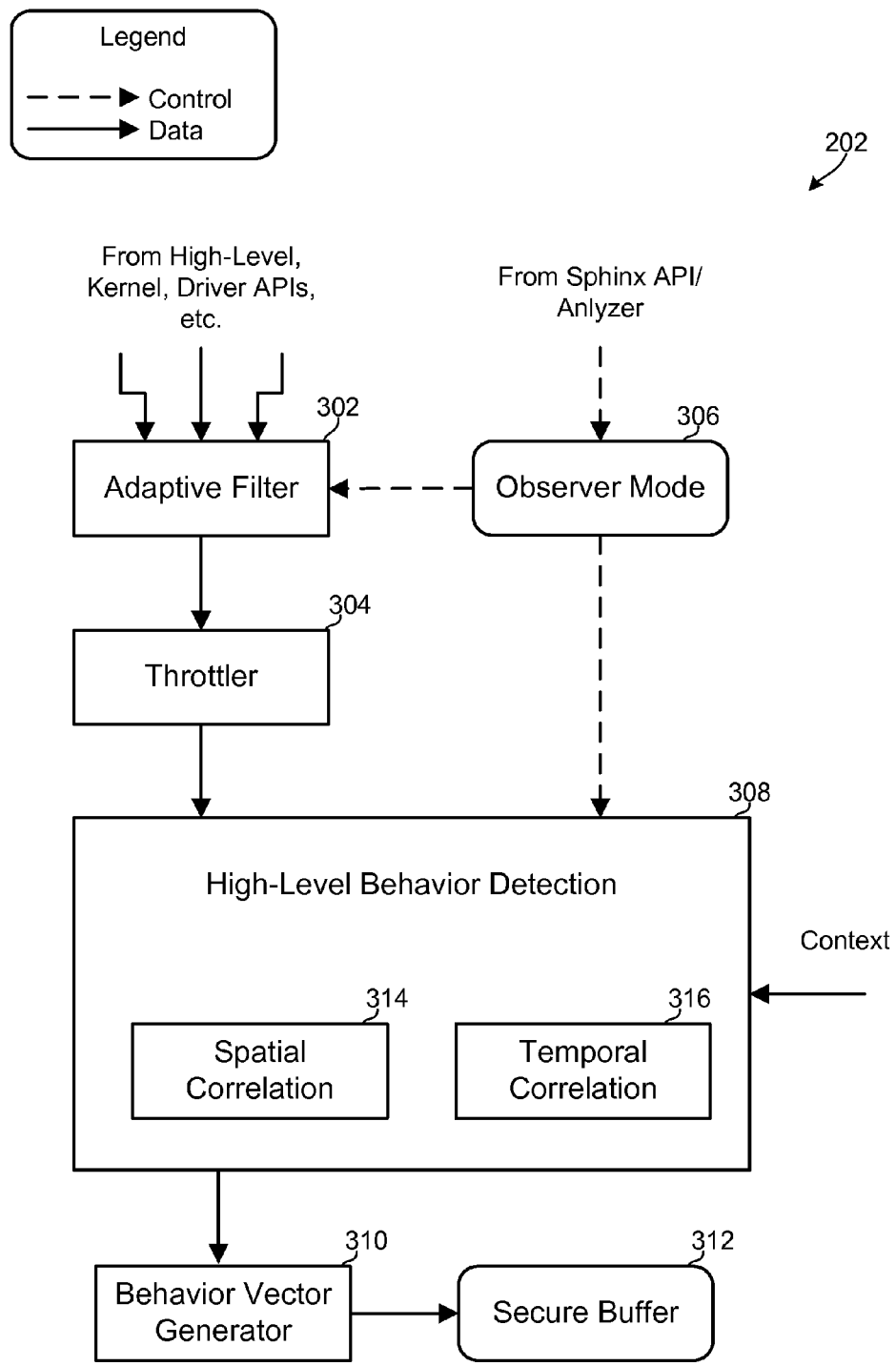
FIG. 3 is a block diagram illustrating example logical components and information flows in an observer module configured to perform dynamic and adaptive observations in accordance with an aspect.

FIG. 3 illustrates example logical components and information flows in an observer module 202 of a computing system configured to perform dynamic and adaptive observations in accordance with an aspect. The observer module 202 may include an adaptive filter module 302, a throttle module 304, an observer mode module 306, a high-level behavior detection module 308, a behavior vector generator 310, and a secure buffer 312. The high-level behavior detection module 308 may include a spatial correlation module 314 and a temporal correlation module 316.

The observer mode module 306 may receive control information from various sources, which may include an analyzer unit (e.g., the analyzer module 204 described above with reference to FIG. 2) and/or an application API. The observer mode module 306 may send control information pertaining to various observer modes to the adaptive filter module 302 and the high-level behavior detection module 308.

The adaptive filter module 302 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 304, which may be responsible for controlling the amount of information flowing from the filter to ensure that the high-level behavior detection module 308 does not become flooded or overloaded with requests or information.

The high-level behavior detection module 308 may receive data/information from the throttle module 304, control information from the observer mode module 306, and context information from other components of the mobile device. The high-level behavior detection module 308 may use the received information to perform spatial and temporal correlations to detect or identify high level behaviors that may cause the device to perform at sub-optimal levels. The results of the spatial and temporal correlations may be sent to the behavior vector generator 310, which may receive the correlation information and generate a behavior vector that describes the behaviors of particular process, application, or sub-system. In an aspect, the behavior vector generator 310 may generate the behavior vector such that each high-level behavior of a particular process, application, or sub-system is an element of the behavior vector. In an aspect, the generated behavior vector may be stored in a secure buffer 312.

Examples of high-level behavior detection may include detection of the existence of a particular event, the amount or frequency of another event, the relationship between multiple events, the order in which events occur, time differences between the occurrence of certain events, etc.

In the various aspects, the observer module 202 may perform adaptive observations and control the observation granularity. That is, the observer module 202 may dynamically identify the relevant behaviors that are to be observed, and dynamically determine the level of detail at which the identified behaviors are to be observed. In this manner, the observer module 202 enables the system to monitor the behaviors of the mobile device at various levels (e.g., multiple coarse and fine levels). The observer module 202 may enable the system to adapt to what is being observed. The observer module 202 may enable the system to dynamically change the factors/behaviors being observed based on a focused subset of information, which may be obtained from a wide verity of sources.

As discussed above, the observer module 202 may perform adaptive observation techniques and control the observation granularity based on information received from a variety of sources. For example, the high-level behavior detection module 308 may receive information from the throttle module 304, the observer mode module 306, and context information received from other components (e.g., sensors) of the mobile device. As an example, a high-level behavior detection module 308 performing temporal correlations might detect that a camera has been used and that the mobile device is attempting to upload the picture to a server. The high-level behavior detection module 308 may also perform spatial correlations to determine whether an application on the mobile device took the picture while the device was holstered and attached to the user's belt. The high-level behavior detection module 308 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 308 may recognize this as a potentially threatening behavior and initiate an appropriate response (e.g., shutting off the camera, sounding an alarm, etc.).

In an aspect, the observer module 202 may be implemented in multiple parts.

Figure 4:
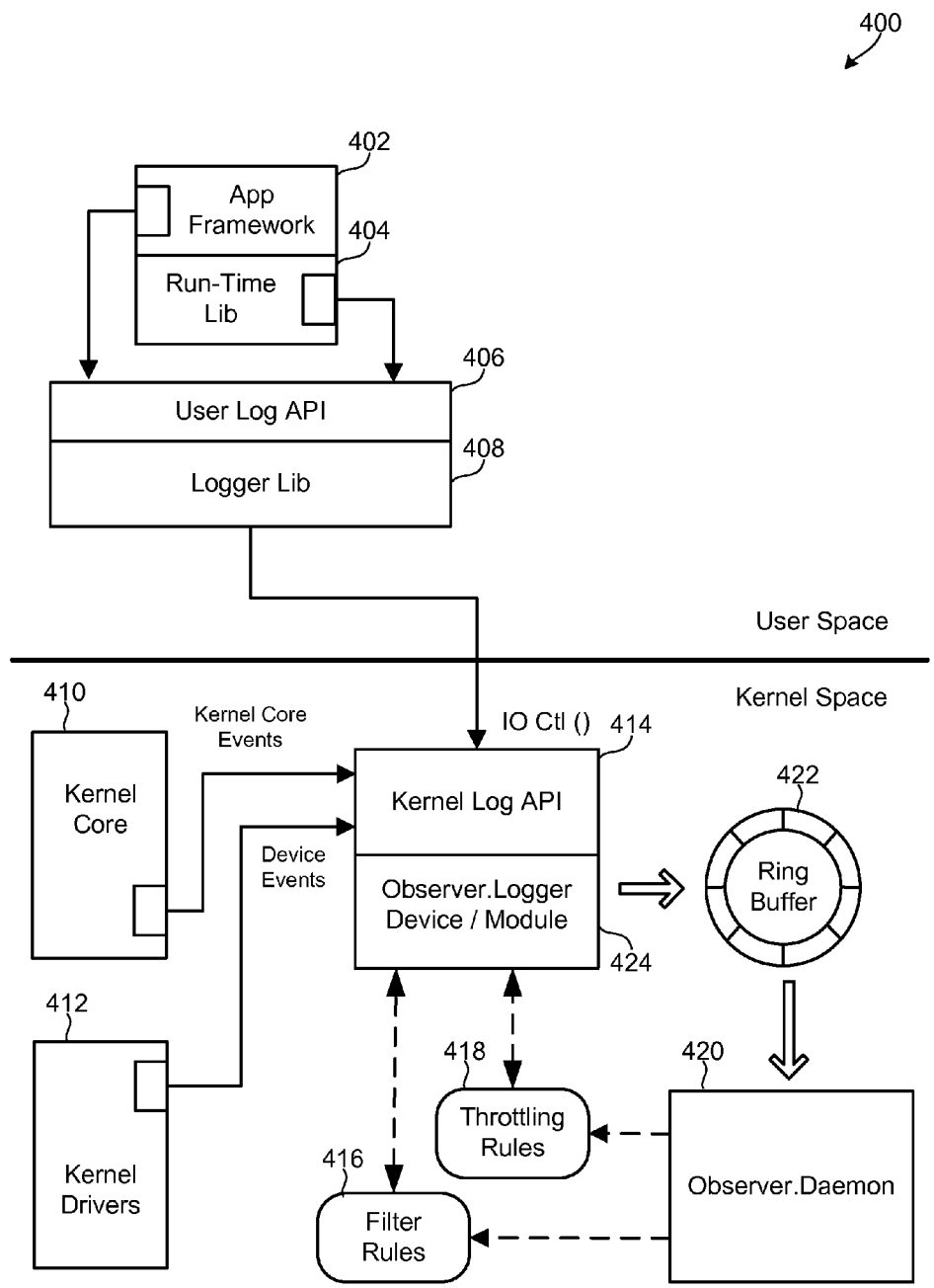
FIG. 4 is a block diagram illustrating logical components and information flows in a computing system implementing observer modules in accordance with an aspect.

FIG. 4 illustrates logical components and information flows in an example computing system 400 implementing an observer module in accordance with an aspect. The illustrated computing system 400 includes an application framework 402, a run time library 404, a user log API 406, and a logger library 408 in the user space. The computing system 400 may include a kernel core 410, kernel drivers 412, a kernel log API 414, an observer logger 424, a filter rules module 416, a throttling rules module 418, a ring buffer 422, and an observer daemon 420 in the kernel space. In an aspect, the ring buffer 422 may be a fixed-sized and/or circular buffer. In an aspect, the combination of the user log API 406 and the kernel log API 414 may constitute the observer logger 424. In an aspect, the combination of the observer daemon 420 and the observer logger 424 may constitute the observer module 202.

The application framework 402 and the run time library 404 may be preexisting software code/components of the mobile device, each of which may be instrumented with logic to monitor activities and send information to the user log API 406 in the user space. The user log API 406 may provide an API that enables the user space applications to communicate with the kernel via the kernel log API 414.

In an aspect, the observer logger 424 may be automatically invoked whenever a particular event, action, or API (e.g., an API identified in a list of APIs as being of particular importance) is invoked, and the corresponding information may be stored in the ring buffer 422. The information stored in the ring buffer 422 may include, for example, information for identifying the caller, information for identifying the exact function being called, the parameters that have been passed to the function call, and other similar information. In an aspect, this information may be stored in the ring buffer 422 in a raw format. Alternatively, the ring buffer 422 may be used to store information after the log has been processed.

The observer logger 424 may be controlled by a set of filter and throttling rules 416, 418. The filter rules 416 may specify whether a particular API is to be logged or not. The throttling rules 418 may specify conditions under which the system is to termination the logging/monitoring of a specific API to prevent overloads.

The filter and throttling rules 416, 418 may be created, updated, and/or maintained by the observer daemon 420. For example, if after observing the mobile device for ten minutes, the observer daemon 428 decides that a particular API is no longer of interest (e.g., it is not providing the system with useful information), the observer daemon 420 may update the filter rules 416 such that events relating to that particular API are no longer monitored/logged.

Figure 5A:
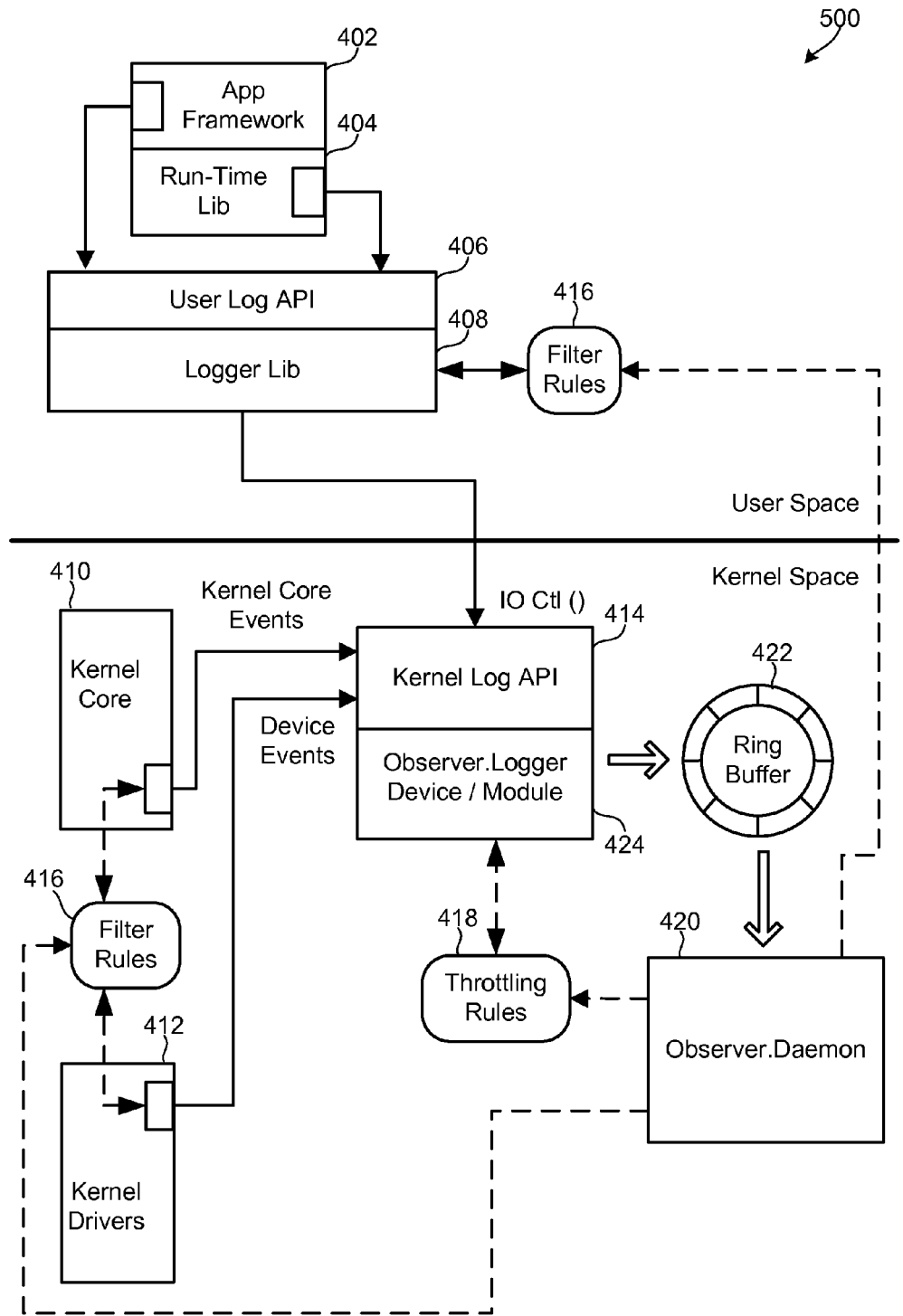
FIG. 5A through 8B are block diagrams illustrating logical components and information flows in a computing system implementing observer modules and observer daemons in accordance with the various aspects.

FIG. 5A illustrates logical components and information flows in a computing system 500 implementing an observer module 202 in accordance with another aspect. The computing system 500 illustrated in FIG. 5A includes all the components described above with reference to FIG. 4, except that the filter rules 416 are enforced on the user log API 406 in the user space and/or kernel space on the device. Thus, instead of each call coming to the observer logger 424 and the observer logger 424 deciding whether the call should be logged or not (as described with reference to FIG. 4), the filter rules 416 may be implemented within the instrumentations (e.g., user log API, etc.) such that the call itself will not reach the logger based on the filter rules 416. Implementing the configuration illustrated in FIG. 5A may further improve the mobile device efficiency because function calls do not need to be made to a logger inside the kernel.

Figure 5B:
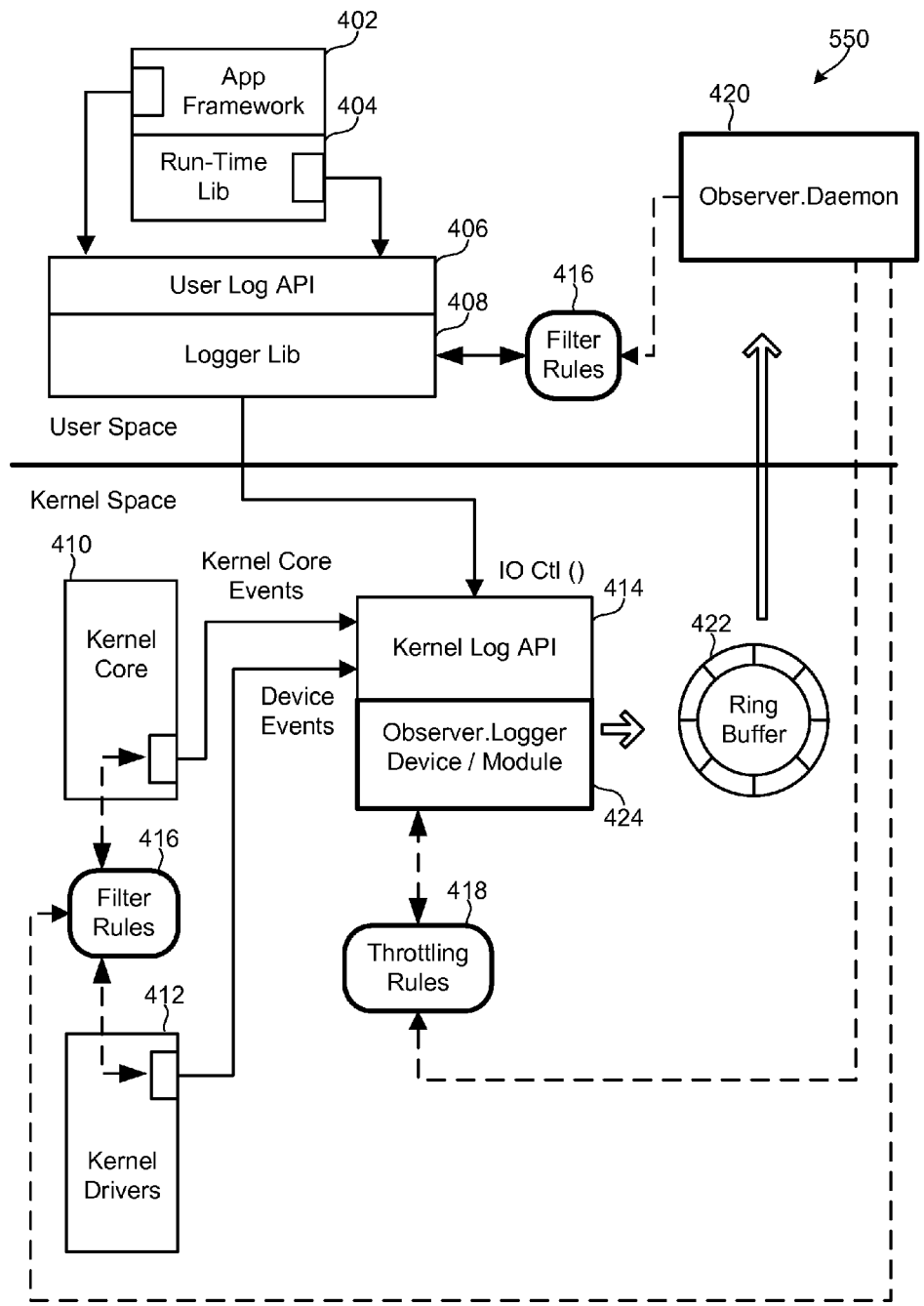

FIG. 5B illustrates logical components and information flows in a computing system 550 implementing an observer module in accordance with yet another aspect. The computing system 550 illustrated in FIG. 5B includes all the components described above with reference to FIG. 5A, except that the observer daemon 420 is in the user space. In an aspect, the observer daemon 420, filter rules 416, throttling rules 418, and observer logger 424 may be part of the same component. Implementing the configuration illustrated in FIG. 5B may further improve the mobile device efficiency because the observer daemon 420 may update the filter rules without functions calls into the kernel space.

Figure 6A:
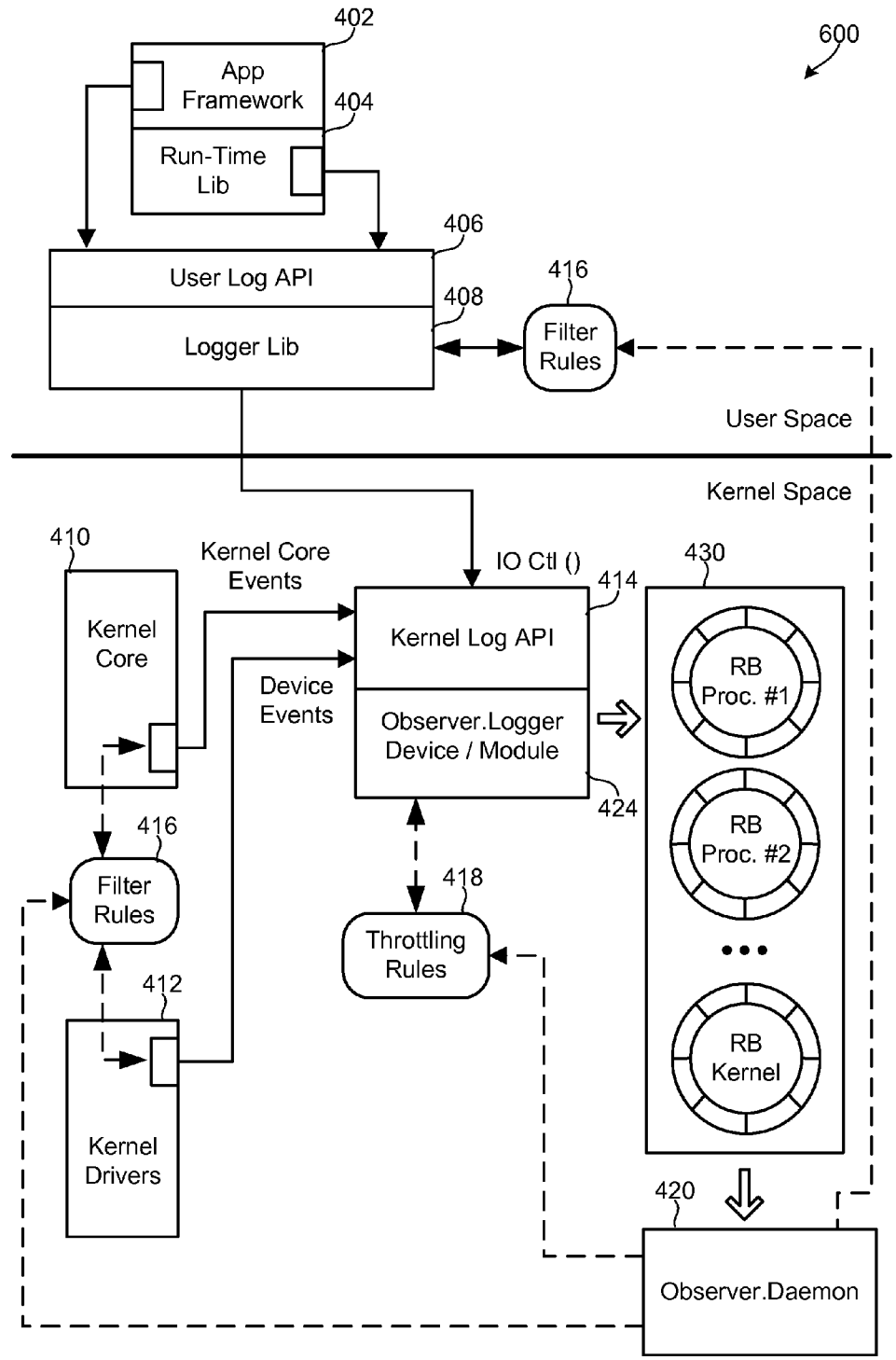
Figure 6B:
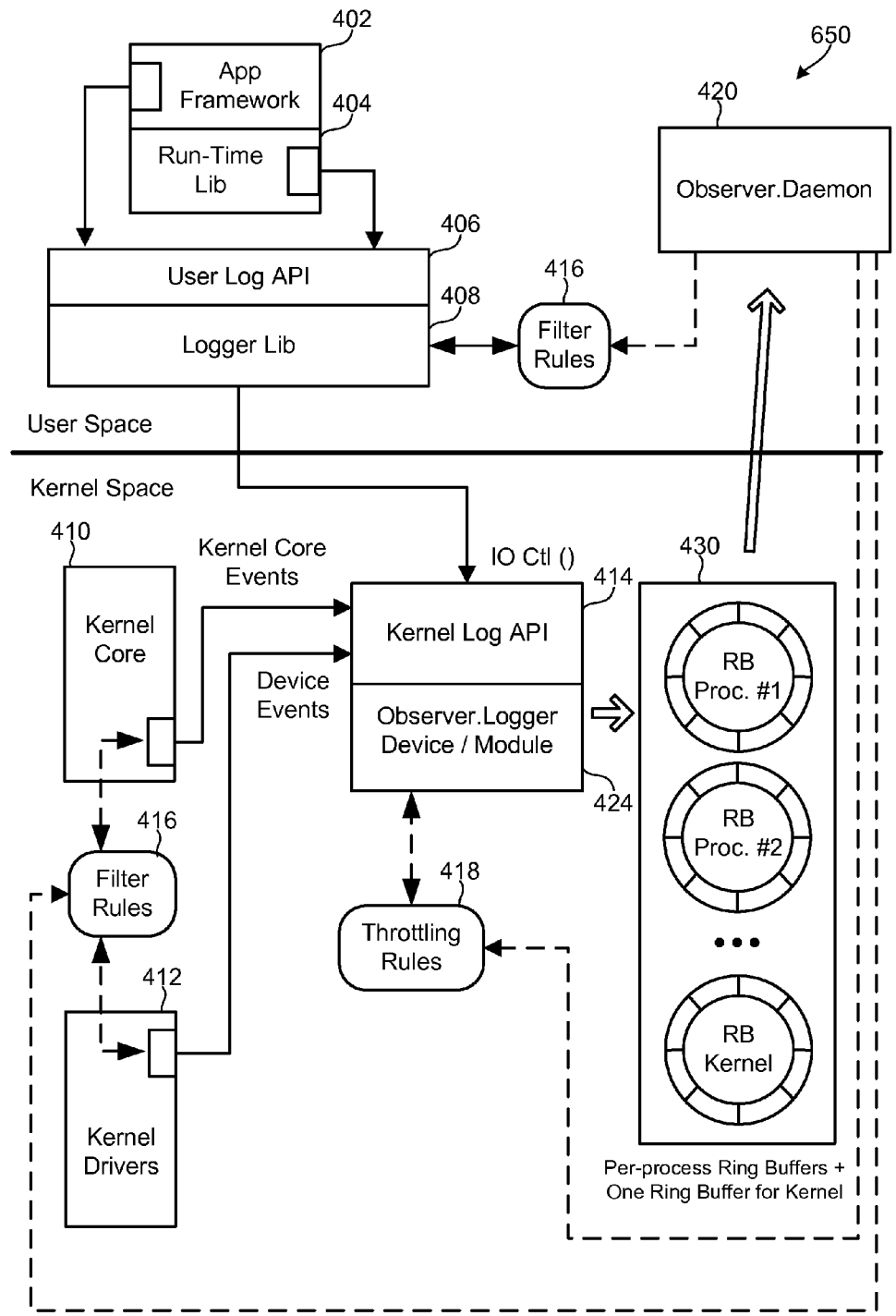

At any given time, several applications and several kernel threads may be attempting to store/write information in the ring buffer, which may cause contention issues that hinder scalability. In an aspect, the system's scalability may be improved via the inclusion of multiple ring buffers, as illustrated in FIGS. 6A-B. The computing system 600 illustrated in FIG. 6A includes all the components described above with reference to FIG. 5A, but includes multiple ring buffers 430. The computing system 600 may include a ring buffer for each application, throttle, and kernel thread being monitored by the system. For example, the computing system 600 may include a ring buffer for a kernel thread being monitored by the system, and one or more ring buffers for each application and/or throttle being monitored by the system. Alternatively, the computing system 600 may include a ring buffer for groups of applications, groups of throttles, and/or groups of kernel threads being monitored by the system. The inclusion of multiple ring buffers enables the computing system 600 to avoid contention issues from arising and reduces bottle necks.

The computing system 650 illustrated in FIG. 6B includes all the components described above with reference to FIG. 6A, except that the observer daemon 420 is in the user space Implementing the configuration illustrated in FIG. 6B may further improve the mobile device efficiency because the observer daemon 420 may update the filter rules without functions calls into the kernel space.

Figure 7A:
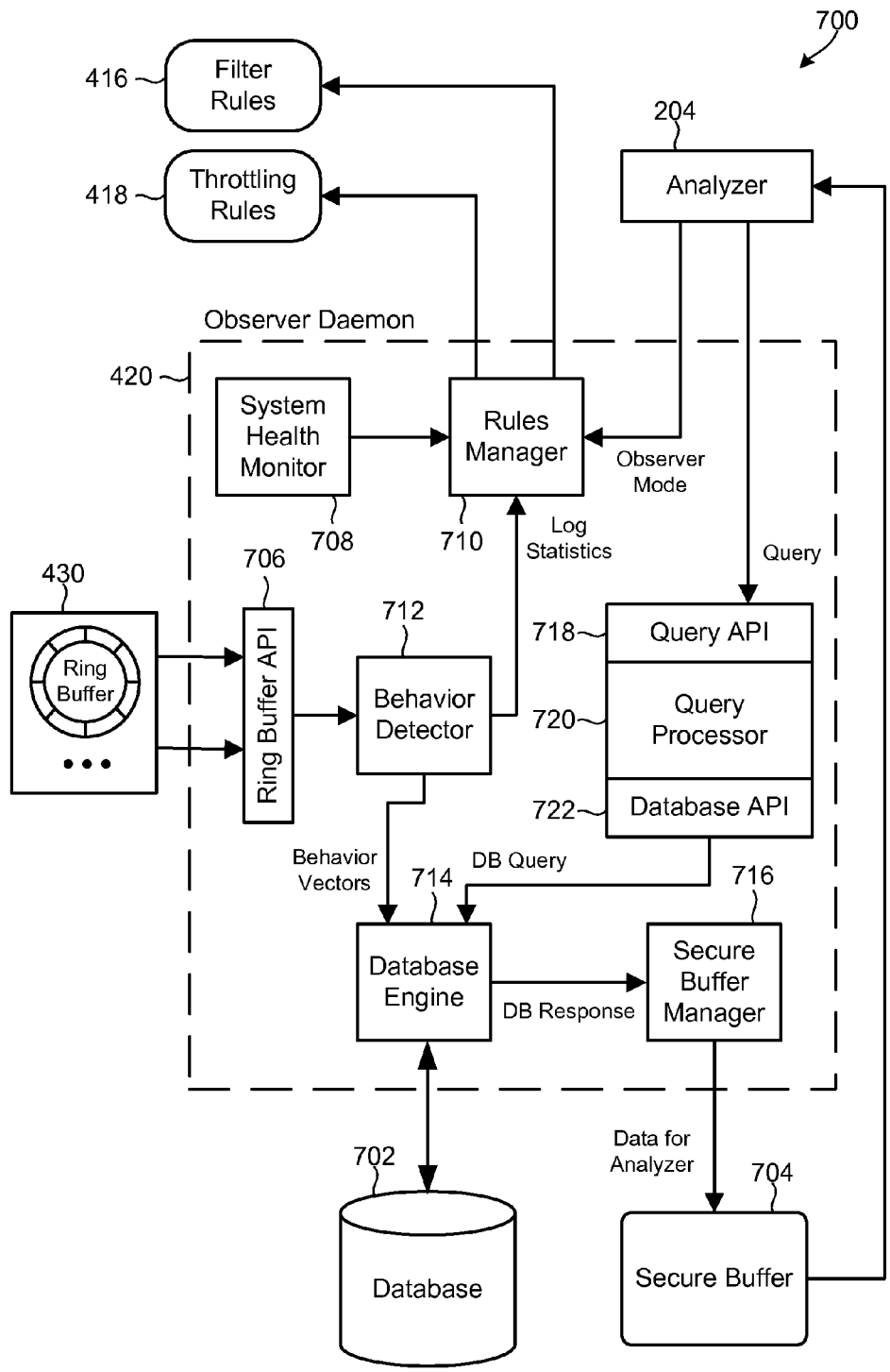

FIG. 7A illustrates logical components and information flows in a computing system 700 implementing an aspect observer daemon 420. The computing system 700 may include an analyzer component (e.g., the analyzer module 204 illustrated in FIG. 2), a filter rules 416 component, a throttling rules 418 component, multiple ring buffers 430, a database 702, a secure buffer 704, and an observer daemon 420. The observer daemon 420 may include a ring buffer API 706, system health monitor 708, a behavior detector 712, a database engine 714, a rules manager 710, a secure buffer manager 716, a query processor 720, a query API 718, a database API 722. A logger (not illustrated) may store information in the ring buffers 430. The observer daemon 420 may extract the information from the ring buffers 430 via the ring buffer API 706. The behavior detector 712 may receive information from the ring buffer API 706, and perform correlation and formatting operations on the received data to generate a behavior vector.

The generated behavior vector may be sent to the database engine 714 for storing in the database 702. The database engine 714 may manage all of the specificities of the database implementation (e.g., kind of data structure that is implemented, types of information included in the data structure, etc.).

The rules manager 710 may be configured to receive inputs from different components (e.g., system health monitor, behavior detection unit, analyzer, etc.), and update the filter and throttle rules 416, 418 based on the received inputs. For example, the rules manager 710 may receive log statistics from the behavior detector 712 and update the filter and throttle rules 416, 418 based on the log statistics.

The system health monitor 708 may be configured to monitor system resources, and inform the rules manager 710 of the system health. For example, the system health monitor 708 may inform the rules manager 710 about the amount of energy that remains stored in the battery, how much memory is available, whether there are enough resources to perform a detailed observation, etc. The rules manager 710 may use the information received from the system health monitor 708 to update the rules. For example, if the system health monitor 708 indicates that the device battery state is below a certain threshold, the rules manager 710 may update the filter rules 416 such that the system performs more coarse observations in order to reduce power consumption.

The query processor 720 may be configured to perform conversions between various API's, such as from a query API 718 to a database API 722.

The secure buffer 704 may enable kernel space components (e.g., in the un-trusted region) to communicate with the user space components (e.g., in the trusted region).

The secure buffer manager 716 may be configured to control the communications that occur via the secure buffer 704.

The database engine 714 may be configured to store the database response to the secure buffer manager 716, which may perform flow control operations and store the information in the secure buffer 704.

The information generated by the observer daemon 420 may be utilized by an analyzer 204, which may be implemented in the kernel space, user space, or in a trusted computing base of a system-on-chip (SOC).

Figure 7B:
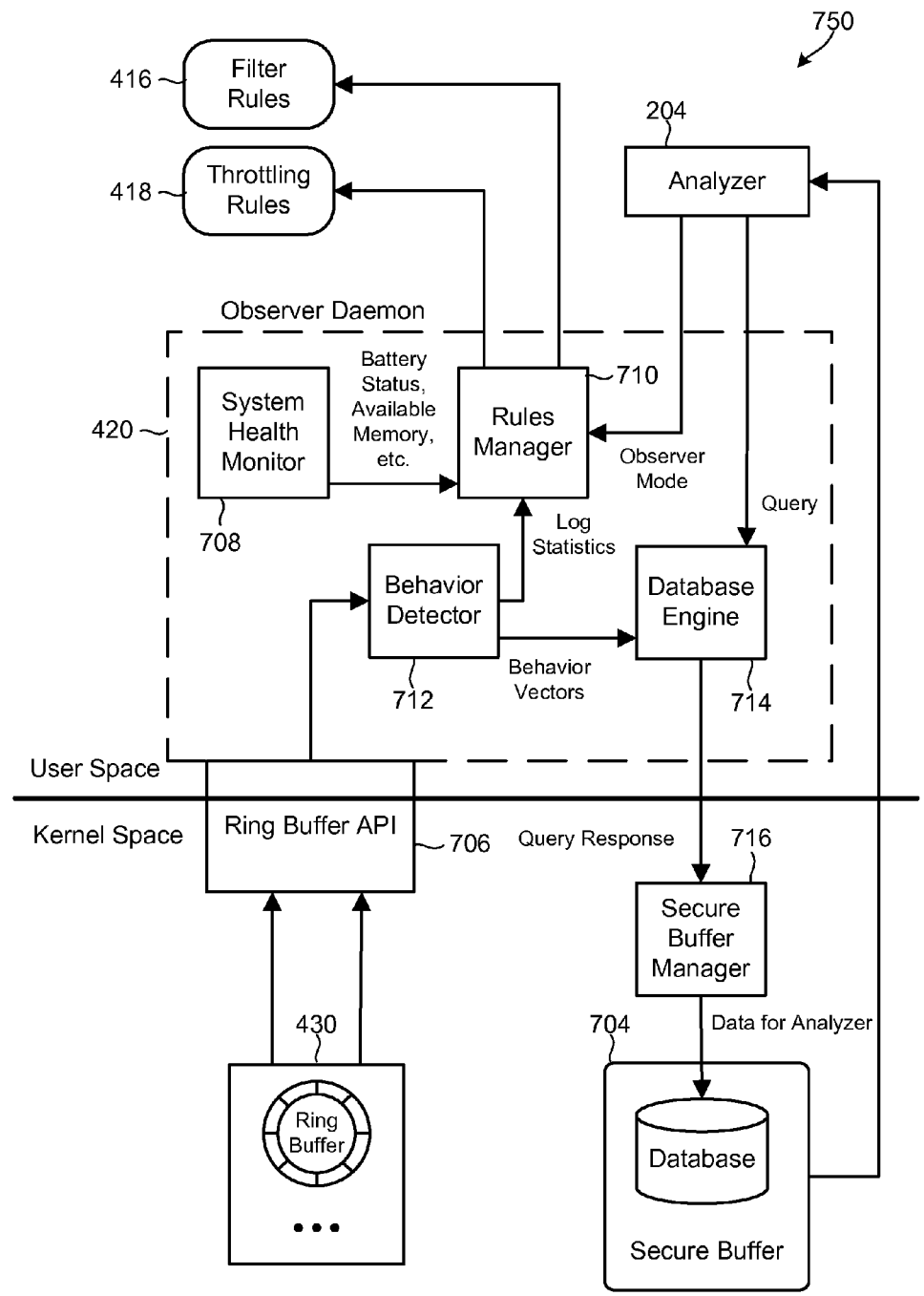

FIG. 7B illustrates logical components and information flows in a computing system 750 implementing another aspect observer daemon 420. The computing system 750 may include an analyzer 204 component, a filter rules 416 component, a throttling rules 418 component, multiple ring buffers 430, a secure buffer 704, a secure buffer manager 716, and an observer daemon 420. The observer daemon 420 may include a ring buffer API 706, system health monitor 708, a behavior detector 712, a database engine 714, and a rules manager 710. A logger (not illustrated) may store information in the ring buffers 430. The computing system 750 may perform the same operations as the computing system 700 illustrated in FIG. 7A, except that the secure buffer manager 716 is in the kernel space and may control the data that is sent to an analyzer 204 in the user space.

Figure 8A:
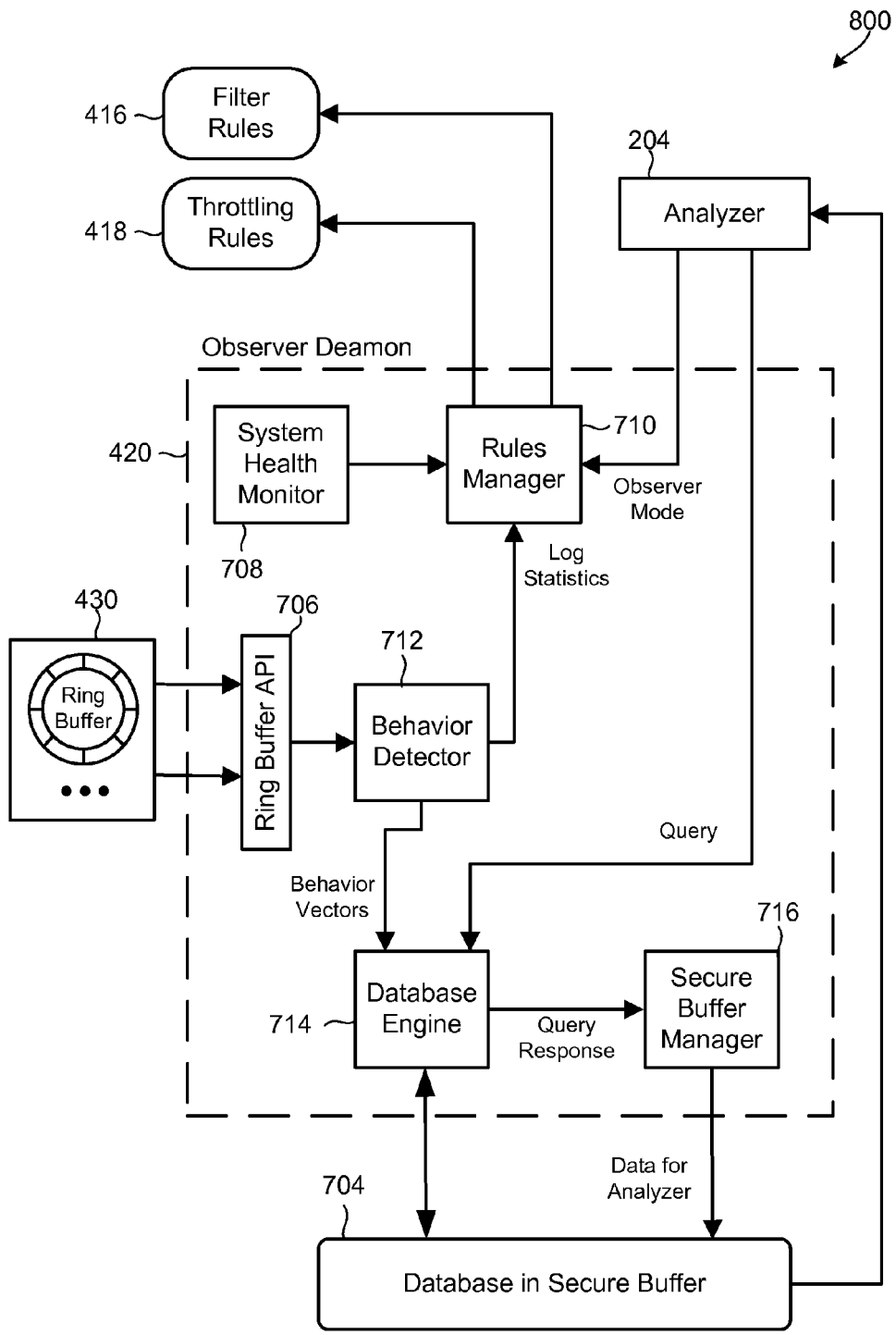

FIG. 8A illustrates logical components and information flows in a computing system 800 implementing another aspect observer daemon. The computing system 800 illustrated in FIG. 8A includes all of the components described above with reference to FIG. 7A, except for a query processor because the database in this aspect is included as part of the secure buffer. In this configuration, whenever the analyzer issues a query, the query may come directly from the database engine. Similarly, responses to the query may be sent directly from the secure buffer to the analyzer.

Figure 8B:
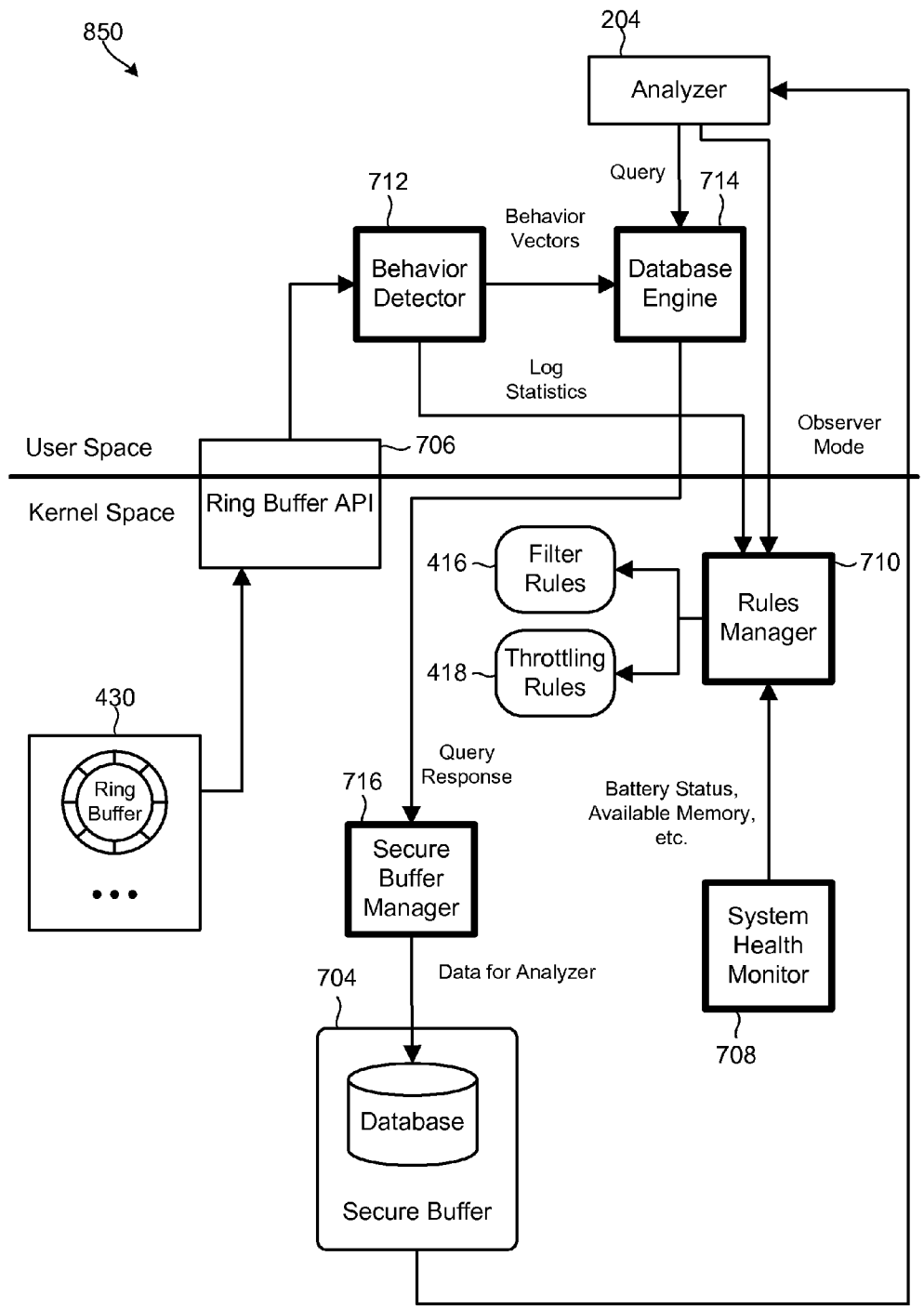

FIG. 8B illustrates logical components and information flows in a computing system 800 implementing yet another aspect observer daemon. In the example illustrated in FIG. 8B, the observer daemon includes a behavior detector 712 and a database engine 714 in the user space, and a secure buffer manager 716, a rules manager 710, and a system health monitor 708 in the kernel space.

The various aspects provide cross-layer observations on mobile devices encompassing webkit, SDK, NDK, kernel, drivers, and hardware in order to characterize system behavior. The behavior observations may be made in real time.

An important feature of the various aspects is that the observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9A:
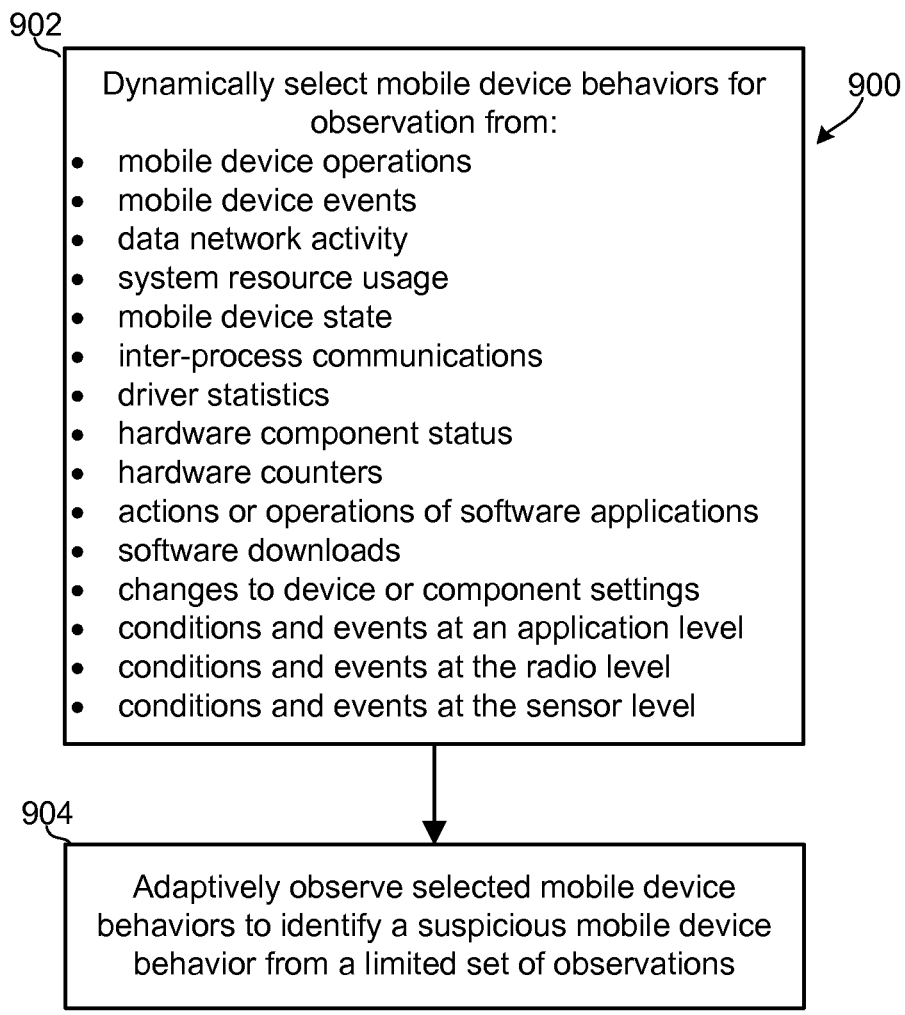
FIG. 9A is a process flow diagram illustrating an aspect method for performing adaptive observations on mobile devices.

FIG. 9A illustrates an aspect method 900 for dynamically selecting mobile device behaviors for observation in order to identify suspicious mobile device behaviors. In block 902, the mobile device processor may select for observation mobile device behaviors and/or states that will be observed. This selection of device behaviors and/or states may include the selection of a subset of a wide range of behaviors, actions and states. Thus, the selection in block 902 may be one or more of mobile device operations, mobile device events, data network activity, system resource usage, mobile device state, inter-process communications, driver statistics, hardware component status, hardware counters, actions or operations of software applications, software downloads, changes to device or component settings, conditions and events at an application level, conditions and events at the radio level, conditions and events at the sensor level, conditions and events at a hardware level, conditions and events at a driver level, and conditions and events at a high level. In block 904, the mobile device may begin observing the selected device behaviors and/or states and process the observations in order to identify suspicious mobile device behaviors. Since only the selected subset of device behaviors and/or states are observed, this enables the processor to detect suspicious behaviors based on a limited set of observations.

Examples of mobile device operations that may be selected in block 902 and observed in block 904 include, for example, one or more of library API calls in an application framework or run-time library, system call APIs, file-system and networking sub-system operations, file system activity, searches for filenames, categories of file accesses, creating files, deleting files, file read/write/seek operations, and changing file permissions.

Examples of mobile device events that may be selected in block 902 and observed in block 904 include, for example, device state changes and/or sensor devices state changes.

Examples of mobile device data network activities that may be selected in block 902 and observed in block 904 include, for example, one or more of types of connections, protocols, port numbers, server/client that the device is connected to, the number of connections, volume or frequency of communications, phone network activity, type and number of calls/messages sent, type and number of calls/messages received, type and number of calls/messages intercepted, call information, text messaging information, media messaging, user account information, transmissions, voicemail, and device identifiers (e.g., DeviceIDComm).

Examples of mobile device system resource usage that may be selected in block 902 and observed in block 904 include, for example, monitoring the number of forks, memory access operations, and/or the number of files open.

Examples of mobile device states that may be selected in block 902 and observed in block 904 include, for example, display on/off state, locked/unlocked state, battery charge state, camera state, and microphone state.

Examples of mobile device inter-process communications that may be selected in block 902 and observed in block 904 include, for example, monitoring intents to crucial services (browser, contracts provider, etc.), monitoring the degree of inter-process communications, and monitoring pop-up windows.

Examples of mobile device driver statistics that may be selected in block 902 and observed in block 904 include, for example, statistics from drivers for one or more of cameras, sensors, electronic displays, Wi-Fi communication components, data controllers, memory controllers, system controllers, access ports, peripheral devices, wireless communication components, and external memory chips.

Examples of mobile device driver hardware component status that may be selected in block 902 and observed in block 904 include, for example, cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

Examples of mobile device hardware counters that may be selected in block 902 and observed in block 904 include, for example, hardware counters that denote the state or status of the mobile computing device and/or mobile device sub-systems, and special-purpose registers of processors/cores that are configured to store a count or state of hardware-related activities or events.

Examples of mobile device driver statistics that may be selected in block 902 and observed in block 904 include, for example, statistics from drivers for one or more of cameras, sensors, electronic displays, Wi-Fi communication components, data controllers, memory controllers, system controllers, access ports, peripheral devices, wireless communication components, and external memory chips.

Examples of mobile device actions or operations of software applications that may be selected in block 902 and observed in block 904 include, for example, monitoring of information used by software applications including one or more of location information, camera information, accelerometer information, browser information, content of browser-based communications, content of voice-based communications, short range radio communications, content of text-based communications, content of recorded audio files, phonebook or contact information, contacts lists, calendar information, location information (LocationComm), recorded audio information, accelerometer information, notifications communicated to and from a software application, user verifications, and a user password.

Examples of mobile device software downloads that may be selected in block 902 and observed in block 904 include, for example, software downloads from an application download server, and a first software application requesting the downloading and/or install of a second software application.

Examples of changes to device or component settings that may be selected in block 902 and observed in block 904 include, for example, changes to one or more of compass information, mobile device settings, battery life, gyroscope information, pressure sensors, and screen activity.

Examples of mobile device conditions and events at the application level that may be selected in block 902 and observed in block 904 include, for example, observing user via facial recognition software, observing social streams, observing notes entered by the user, observing event pertaining to the use of an electronic payment service, such as PassBook/Google Wallet/Paypal, observing events relating to the use of VPNs, synchronization, voice searches, voice control, language translators, offloading of data for computations, video streaming, camera usage without user activity, and microphone usage without user activity.

Examples of mobile device conditions and events at the radio level that may be selected in block 902 and observed in block 904 include, for example, determining the presence, existence or amount of any or all of: user interaction with the mobile device before establishing radio communication links or transmitting information, single, dual or multiple SIMs or SIM cards, Internet radio, mobile phone tethering, offloading data for computations, device state communications, the use as a game controller or home controller, vehicle communications, mobile device synchronization, monitoring the use of radios (Wi-Fi, WiMax, Bluetooth, etc.) for positioning, peer-to-peer (p2p) communications, synchronization, vehicle to vehicle communications, and/or machine-to-machine (m2m), and monitoring network traffic usage, statistics, or profiles.

Examples of mobile device conditions and events at the events at the sensor level that may be selected in block 902 and observed in block 904 include, for example, monitoring magnet sensors, detecting near-field communications, collecting information from a credit card scanner, barcode scanner, or mobile tag reader, detecting the presence of USB power charging source, detecting that a keyboard or auxiliary device has been coupled to the mobile device, detecting that the mobile device has been coupled to a computing device (e.g., via USB, etc.), determining whether a light emitting diode, flash, flashlight, or light source has been modified or disabled (e.g., maliciously disabling an emergency signaling app, etc.), determining whether a speaker or microphone has been turned on or powered, detecting a charging or power event, detecting that the mobile device is being used as a game controller, collecting information from medical purpose/healthcare sensors or from scanning the user's body, collecting information from an external sensor plugged into the USB/audio jack, collecting information from a tactile or haptic sensor (e.g., via a vibrator interface, etc.), monitoring communications with and/or behaviors of hardware components coupled to the computing device via the USB or a wireless transceiver (e.g., Wi-Fi, Bluetooth, or NFC), and collecting information pertaining to the thermal state of the mobile device.

Examples of mobile device conditions and events at the hardware level that may be selected in block 902 and observed in block 904 include the number of times, durations, and when location hardware is activated, such as hardware for calculating horizontal dilution of precision (HDoP) for GPS and wireless access point location data, and hardware for measuring round-trip time (RTT) for wireless access point location data. The location hardware may be used to determine location without having to access a location API. The information from the location hardware may be gathered and used by software other than the software of the mobile device, such as cloud-based software, to determine the location of the mobile device. Monitoring the location hardware usage may aid in determining, for example, whether the location of the mobile device is being monitored.

Examples of mobile device conditions and events at the hardware level that may be selected in block 902 and observed in block 904 include the number of times, durations, and when personal area network (PAN) hardware is activated, such as hardware for supporting and implementing Bluetooth, Wi-Fi Direct, ZigBee, and the like short range wireless networking protocols, and HDoP and RTT hardware. The PAN hardware may be used to determine the devices that are visible to and connected to the mobile device. This information from the PAN hardware may make it possible to determine the location of the mobile device based on knowing the location of the visible or connected devices. For example, the locations of PAN enabled devices in a commercial environment used to track or transfer information to and from the mobile device may be used locate the mobile device. The PAN hardware may also be used to determine the versions of and capabilities of the PAN protocols used by the mobile device. Monitoring the PAN hardware usage may aid in determining, for example, whether the location of the mobile device is being monitored, or whether mobile device information is being accessed.

Examples of mobile device conditions and events at the hardware level that may be selected in block 902 and observed in block 904 include the number of times, durations, and when microphone hardware is activated, such as hardware used to support voice activated commands on the mobile device, including waking-up the mobile device from an idle state, hardware used to support listening by the microphone, and hardware used to support ultrasound capabilities. The microphone hardware for voice activated commands on the mobile device may induce the microphone hardware to be in an always-on state, and the information captured that triggers the mobile device to become active or execute other commands may be identified. This information may be used to reproduce signals to cause the mobile device to activate and execute functions not requested by the user. The microphone hardware supporting listening, in some instances in conjunction with the always-on state, may capture information that may be used to record sound, including conversations, and to identify people, venues, and times of the sounds. The microphone hardware for ultrasound capabilities may be used to locate the mobile device within an environment, such as by echolocation. Monitoring the microphone hardware usage may aid in determining, for example, whether the mobile device and its functions are being inappropriately activated and whether the location of the mobile device is being monitored.

Examples of mobile device conditions and events at the hardware level that may be selected in block 902 and observed in block 904 include the number of times, durations, and when speaker hardware is activated, such as hardware used to support ultrasound capabilities. Similar to the microphone hardware for ultrasound capabilities, the speaker hardware for ultrasound capabilities may be used to locate the mobile device within an environment, such as by echolocation. Monitoring the speaker hardware usage may aid in determining, for example, whether the location of the mobile device is being monitored.

Examples of mobile device conditions and events at the hardware level that may be selected in block 902 and observed in block 904 include the number of times, durations, and when camera hardware is activated, such as hardware for supporting light sensing, hardware for supporting non-touch gesture or motion detection, hardware for supporting computational photography, and hardware for supporting zoom functions. The camera hardware for light sensing may produce readings of the amount of light in the environment around the mobile device, which may be used to determine the type of environment (e.g. indoors, or outdoors) in which the mobile device is located. The camera hardware for non-touch gesture or motion detection may produce information causing the mobile device to execute different functions. This information may be used to reproduce signals that may cause the mobile device to execute functions not requested by the user. The hardware for supporting computational photography and zoom functions may be used in an image capture process for the camera. Images captured by the camera could be offloaded and viewed, used to identify people, environments, or time, and could also be stored. Monitoring the camera hardware usage may aid in determining, for example, whether the environment of the mobile device is being monitored and whether the functions of the mobile device are being inappropriately activated and used to capture information and images.

Examples of mobile device conditions and events at the hardware level that may be selected in block 902 and observed in block 904 include the number of times, durations, and when screen hardware is activated, such as hardware for supporting non-touch input/output and hardware supporting visual light communication. Used in conjunction with the camera hardware for non-touch gesture or motion detection, the screen hardware for non-touch input/output may be used to identify signals that control the screen. This information may be used to reproduce the signals, which may be used to keep the screen deactivated while other processes are executed to avoid user detection of malware operations. The screen hardware for visible light communication may be used to send and receive information. The information from the screen hardware for visible light communication may be used to send information from the mobile device, alter information received by the mobile device, and identify the mobile device. Monitoring the screen hardware usage may aid in determining, for example, whether the functions of the mobile device are being inappropriately controlled and whether communications are being watched or tampered with.

Examples of mobile device conditions and events at the hardware level that may be selected in block 902 and observed in block 904 include the number of times, durations, and when universal serial bus (USB) hardware is activated. The information from the USB hardware may be used with the USB version identifier and known bandwidth to determine the amount of available bandwidth on a USB connection. The bandwidth may be monitored by unauthorized software to determine whether unauthorized transfers of data may be executed without affecting the performance of the USB connection. The information may also be used to maliciously throttle the USB connection so that the performance is less than expected. Monitoring the mobile device conditions and events at the driver level for USB hardware may aid in determining, for example, whether unauthorized data transfer or bandwidth limiting is occurring.

Examples of mobile device conditions and events at the hardware level that may be selected in block 902 and observed in block 904 include the number of times, durations, and when synchronization hardware is activated, such as hardware for securing/coding communication channels. The synchronization hardware may be used to identify a type of connection (e.g. Wi-Fi, USB, wired, or wireless), the version of the connection protocol, and the activity level of the connection. This information from the synchronization hardware may be used to determine the bandwidth of the connection and when the connection can be used to transfer information without detection, or to throttle the connection throughput. Monitoring the synchronization hardware usage may aid in determining, for example, whether the connection is being used for unauthorized transfers, or whether the connection performance is being degraded.

Examples of mobile device conditions and events at the driver level that may be selected in block 902 and observed in block 904 for location hardware drivers include the number of times and/or times of occurrence of: requests to send (RTS)/clear to send (CTS) transactions; data null/data acknowledgement transactions; reads of the number of visible location satellites (e.g., GPS satellites); connection attempts of different types when indoors and outdoors; floor messages; and reads of a received signal strength indication (RSSI). A high number of RTS/CTS transaction or data null/data acknowledgment transactions, which are related to location queries, may indicate attempts to determine the location of the mobile device. A high number of reads of the number of visible location satellites may indicate attempts to determine the accuracy of a location of the mobile device. When the mobile device is indoors and it continues to attempt to communicate with location satellites or make a high number of RTT measurements to wireless access points may indicate an attempt to determine the location of the mobile device. Similarly, when the mobile device is outdoors and it continues to attempt to make RTT measurements to indoor type wireless access points may indicate an attempt to determine the location of the mobile device. A high number of request for floor information or reads of the RSSI may also indicate an attempt to determine the location of the mobile device. Monitoring the mobile device conditions and events at the driver level for location hardware drivers may aid in determining, for example, whether the location of the mobile device is being monitored.

Examples of mobile device conditions and events at the driver level that may be selected in block 902 and observed in block 904 for personal area network (PAN) hardware drivers include packet exchange statistics, the number of times and/or times of occurrence of: reads of the RSSI, reads of the devices connected or visible to the mobile device; and reads of the versions of the PAN protocols and capabilities of the connected PAN devices. Similar to the location hardware drivers, the number of reads of the RSSI and high numbers and rates of packet exchanges may indicate an attempt to determine the location of the mobile device. The packet exchange statistics may also indicate unauthorized transmissions of data. The number of reads of the connected or visible PAN devices and their wireless protocols and capabilities may indicate an attempt to find the location of the mobile device, as this information may help indicate the range of these connected and visible devices. Monitoring the mobile device conditions and events at the driver level for PAN hardware drivers may aid in determining, for example, whether the location of the mobile device is being monitored, or if mobile device information is being accessed.

Examples of mobile device conditions and events at the driver level that may be selected in block 902 and observed in block 904 for near field communication (NFC) hardware drivers include packet exchange statistics, and number of times and/or times of occurrence of: reads of the distance or signal strength between the mobile device and an NFC device; reads of the NFC devices connected or visible to the mobile device; and reads of the versions of the NFC protocols and capabilities of the connected NFC devices. The packet exchange statistics may indicate unauthorized transmissions of data between the mobile device and NFC devices. The number of reads of the distance or signal strength between the mobile device and an NFC device, the connected or visible PAN devices, and their wireless protocols and capabilities may indicate an attempt to find the location of the mobile device. For example, when the location of an NFC device is known or NFC is used for checking in at a location, connection with the NFC device may indicate the location of the mobile device. Also, connection with an NFC device may alter security levels on the mobile device, putting a device in a lower security state due to the low power and short distance nature of NFC communication. This low security state may leave the mobile device vulnerable to unauthorized access or the introduction of malware. Monitoring the mobile device conditions and events at the driver level for NFC hardware drivers may aid in protecting the mobile device from unauthorized access during a low security level state by indicating the existence of potentially harmful entities, such as software.

Examples of mobile device conditions and events at the driver level that may be selected in block 902 and observed in block 904 for microphone hardware drivers include the number of times and/or when input/output control (ioctl) calls to access the microphone or calls for digital communication via an audio port occur. As discussed previously, access to the microphone may be used for surreptitious recording and echolocation. Unauthorized access to the microphone drivers may be identified by an unusually high number of ioctl clients running concurrently. In many cases, it may be unusual for even more than one ioctl client to be running for the microphone. Audio ports may be used as inputs for receiving information from connected peripheral devices, such as magnetic strip readers for processing credit card information. Unauthorized access to the communications over audio ports may compromise this information. Like for the microphone, monitoring the number of clients reading the data from the audio port may identify whether unauthorized access to communications on the audio ports is occurring. Monitoring the mobile device conditions and events at the driver level for microphone hardware drivers may aid in determining, for example, whether the mobile device and its functions are being inappropriately activated and whether the location of the mobile device is being monitored.

Examples of mobile device conditions and events at the driver level that may be selected in block 902 and observed in block 904 for speaker hardware drivers include the number of time or when input/output control (ioctl) calls to access the speaker occur. As discussed previously, the speaker may be used to echolocate the mobile device. Much like the microphone and the audio port, the number of clients accessing the speaker is likely to be limited, and an unusually high number of clients accessing the speaker may be indicative of unauthorized access. Monitoring the mobile device conditions and events at the driver level for speaker hardware drivers may aid in determining, for example, whether the location of the mobile device is being monitored.

Examples of mobile device conditions and events at the driver level that may be selected in block 902 and observed in block 904 for camera hardware drivers include the number of time and/or when image capture, computational photography, flashlight and zoom functions are used. These functions of the camera may be used to capture images. Images captured by the camera could be offloaded and viewed, used to identify people, environments, or time, and could also be stored. Monitoring the mobile device conditions and events at the driver level for camera hardware drivers may aid in determining, for example, whether the functions of the mobile device are being inappropriately activated and used to capture information and images.

Examples of mobile device conditions and events at the driver level that may be selected in block 902 and observed in block 904 for gyroscope hardware drivers include the number of times and/or when input/output control (ioctl) calls to access the gyroscope occur. The information accessible when the gyroscope is active may include positional data related to the mobile device, including the tilt of the mobile device in a three dimensional space. Such information may be used to deduce the location of the mobile device. For example, a substantially flat tilt in the axis perpendicular to the ground may indicate that the mobile device is on a table. Similarly, a substantially vertical tilt in the axis perpendicular to the ground may indicate that the mobile device is docked in a peripheral device or holder. Monitoring the mobile device conditions and events at the driver level for gyroscope hardware drivers may aid in determining whether the location of the mobile device is being monitored, such as when active operations or functions are inconsistent with the orientation of the mobile device.

Examples of mobile device conditions and events at the driver level that may be selected in block 902 and observed in block 904 for browser supporting hardware drivers include the number of times and/or when HTML5 or JavaScript are utilized, and graphics processing units (GPUs) or digital signal processors (DSPs) are utilized. Some World Wide Web Consortium (W3C) standardized languages, such as HTML 5, and scripting languages, such as JavaScript, may be able to access the processors, such as the GPU or DSP, of the mobile device. These languages may also have access to the sensors on the mobile device via the Internet, and the information from the sensor may be offloaded to a cloud server. The languages may be used to access information from the processors and sensors. The processors may also be used to run unauthorized code. Monitoring the mobile device conditions and events at the driver level for browser supporting hardware drivers may aid in determining, for example, whether unauthorized monitoring of the sensors and the processors of the mobile device is occurring, or the processors are being used to run unauthorized code.

Examples of mobile device conditions and events at the driver level that may be selected in block 902 and observed in block 904 for battery hardware drivers include the number of times and/or when the instantaneous discharge rate or charging state indicators are read. Unauthorized software may track the instantaneous discharge rate and the charging state to determine how much of the resources of the mobile to use while avoiding impacting the performance of the mobile device which could lead to detection of the unauthorized software. For example, when the instantaneous discharge rate indicates that the mobile device's battery is depleting at a high rate, the unauthorized software may use minimal resources to avoid increasing the discharge rate. However, if the charging state indicates that the mobile device is charging, the unauthorized software may determine that it may use more resources without adversely affecting the battery charge level. Monitoring the mobile device conditions and events at the driver level for battery hardware drivers may aid in determining, for example, whether unauthorized software is running on the mobile device.

Examples of mobile device conditions and events at the driver level that may be selected in block 902 and observed in block 904 for universal serial bus (USB) hardware drivers include the number of times or when a connection mode and an activity mode are read. The information from the USB hardware drivers may be used with the USB version identifier and known bandwidth to determine the amount of available bandwidth on a USB connection. The bandwidth may be monitored by unauthorized software to determine whether unauthorized transfers of data may be executed without affecting the performance of the USB connection. The information may also be used to maliciously throttle the USB connection so that the performance is less than expected. Monitoring the mobile device conditions and events at the driver level for USB hardware drivers may aid in determining, for example, whether unauthorized data transfer or bandwidth limiting is occurring.

Examples of mobile device conditions and events at the driver level that may be selected in block 902 and observed in block 904 for storage hardware drivers include the number of times and/or when data is transferred between the mobile device and a memory, a mode of the memory (e.g., privacy or protected mode) is read, and a type or speed indicator of the memory is read. Unauthorized software may use the information related to the storage hardware drivers to determine when and how to transfer data to and from the memory to reduce the risk of being discovered, such as making transfers when the memory is not otherwise occupied and additional transfers would not cause a perceivable change in the performance. The information could also be used by unauthorized software to maliciously reduce the performance of data transfers with the memory. Monitoring the mobile device conditions and events at the driver level for storage hardware drivers may aid in determining, for example, whether unauthorized data transfer or performance limiting is occurring.

Examples of mobile device conditions and events at the driver level that may be selected in block 902 and observed in block 904 for user interaction hardware drivers include the number of times or when statistics of keystrokes or touch events by screen area or by frequency are accessed, as well as actions of device sensors used to recognize and react to user gestures (i.e., gesture recognition sensors and modules). User interfaces, such as touchscreens or keyboards, may be used to frequently input sensitive information. For example, users may repeatedly interact with the user interface to unlock the mobile device or login to an account by entering a password or gesture based pattern, or users may frequently enter credit card numbers to make a purchase. Statistical information about how the user interacts with the user interface may be used by the mobile device for predictive input purposes, such as suggesting a word to type, or modifying a virtual keyboard so that the user might type more accurately. This information, when accessed without authorization, may be used to determine common patterns of interaction and deduce the sensitive information the user may have entered. Monitoring the mobile device conditions and events at the driver level for user interaction hardware drivers may aid in determining, for example, whether unauthorized access to the user interaction with the user interface statistics are being monitored.

Examples of observations of user gestures that may be observed in block 904 for user interactions include whether and the frequency at which user movement gestures are recognized and acted upon. Gesture recognition devices and modules may include cameras and image processing modules, inertia sensors (e.g., accelerometers and gyroscopes) and associated processing, relative position sensors communicating with the computing device (e.g., wrist devices that cooperate with a mobile device to resolve a three-dimensional relative positions to enable arm position/movement gestures), and sensors that are capable of detecting and locating parts of the user's body (e.g., fingers or hands) when close but not touching the device. For example, a camera on the computing device positioned to image the user and algorithms executing on the device processor may be configured to recognize when user postures and/or movements match to recognizable gestures correlated to user commands or data inputs. Monitoring the computing device's use or execution of gesture recognition systems and/or analysis modules, particularly in the context of other device states or behaviors, may reveal malicious use of such capabilities (e.g., to monitor images of the user without the user's knowledge).

Examples of mobile device conditions and events at the driver level that may be selected in block 902 and observed in block 904 for synchronization hardware drivers include the number of times and/or when a type of channel security is read. The information for the synchronization hardware drivers may be used to identify a type security used to protect communication on a channel (e.g. WPA/WPA2, VPN, and SSL). This information for the synchronization hardware drivers may be used to determine when a connection is secured and how difficult it might be to crack the security protocol protecting the communications. This information may be used to determine when to attempt read unsecured data transfers, or when it may be easier to crack the security protocol to read the data transfers without authorization. Monitoring the mobile device conditions and events at the driver level for synchronization hardware drivers may aid in determining, for example, whether unauthorized attempts are being made to read data being transferred to and from the mobile device.

Examples of mobile device conditions and events at the driver level that may be selected in block 902 and observed in block 904 for radio interface hardware drivers include the number of times and/or when a usage mode is read. Such modes may include peer-to-peer, mobile-to-mobile, vehicle-to-vehicle, and infrastructure modes. The mode information may identify the types of communication that may be transferred via the radio interfaces. Unauthorized reading of the various communications during different modes may provide information to relate mobile devices and users with other connected machines. Monitoring the mobile device conditions and events at the driver level for radio interface hardware drivers may aid in determining, for example, whether unauthorized attempts are being made to read data being transferred to and from the mobile device.

Examples of mobile device conditions and events at a high level that may be selected in block 902 and observed in block 904 for location hardware include the number of times and/or when the identity of the servers, such as AD servers or PoI servers, the mobile device is trying to access are read. The mobile device may try to access the nearest servers to help reduce lag time in the communications between the mobile device and the servers. The location of the mobile device may be determined based on the identity of the servers it is trying to access by knowing the location of the servers. Monitoring the mobile device conditions and events at the high level for location hardware may aid in determining, for example, whether unauthorized tracking of the mobile device is occurring.

Examples of mobile device conditions and events at a high level that may be selected in block 902 and observed in block 904 for near field communication (NFC) hardware include the number of times and/or when a check-in indicator is read. The mobile device may check-in at a location via an NFC communication with an NFC enabled device, such as a payment device to purchase items or a coupon dispenser in a store. The location of the mobile device may be determined based on the identity and location of the NFC device with which the mobile device checks-in. Monitoring the mobile device conditions and events at the high level for NFC hardware may aid in determining, for example, whether unauthorized tracking of the mobile device is occurring.

Examples of mobile device conditions and events at a high level that may be selected in block 902 and observed in block 904 for screen hardware include the number of times and/or when a screen brightness level is read or a screen capture occurs. Light sensors on the mobile device may indicate when the mobile device is in low or high light areas, which may indicate whether the mobile device is indoors or outdoors. The screen may adjust to the conditions by adjusting its brightness to be brighter when outdoors and darker when indoors. This information may be used to determine the type of environment in which the mobile device is located. Unauthorized software may also take screen captures of what is displayed on the screen. Depending on the timing of such screen captures, sensitive information may be exposed to anyone who views them. Monitoring the mobile device conditions and events at the high level for screen hardware may aid in determining, for example, whether unauthorized tracking of the mobile device is occurring, or whether unauthorized recording of the information being displayed on the screen is occurring.

Examples of mobile device conditions and events at a high level that may be selected in block 902 and observed in block 904 for browser supporting hardware include the number of times and/or when JavaScript statistics are read or sensors are accessed. JavaScript statistics may include CPU and memory usage. Much like other instances of CPU and memory information, these statistics may be used by unauthorized software to determine when to use the CPU and memory to minimize chances of detection by using these resources when they are only managing a lighter load and having little impact on the performance of the mobile device. The sensors of the mobile device (e.g. the camera, the accelerometer, the gyroscope, and the like) may be accessed via the Internet through the browser. The information captured by the sensors may be offloaded to a cloud server through the browser as well. Monitoring the mobile device conditions and events at the high level for browser supporting hardware may aid in determining, for example, whether unauthorized software is being run on the mobile device or whether unauthorized access of the sensors on the mobile device is occurring.

Examples of mobile device conditions and events at a high level that may be selected in block 902 and observed in block 904 for storage hardware include the number of times and/or when reads from and writes to the storage device occur. Unauthorized software may read sensitive information from the storage device of the mobile device. The unauthorized software may also write harmful code to or overwrite, thus deleting, data from the storage device. Monitoring the mobile device conditions and events at the high level for storage hardware may aid in determining, for example, whether unauthorized software is manipulating the storage device of the mobile device, or getting unauthorized access to the data stored on the storage device.

Examples of mobile device conditions and events at a high level that may be selected in block 902 and observed in block 904 for accelerometer hardware include the number of times and/or when reads of the accelerometer data occur. The accelerometer in the mobile device may be activated whenever the mobile device is moved. Certain movements may invoke certain functions of the mobile device, or may be correlated with subsequent functions of the mobile device. For example, a certain gesture may be used to unlock or wake-up the mobile device, or initiate a data transfer to another device. Similarly, a certain movement may commonly occur before a particular function is invoked. For example, the mobile device suddenly moving in a substantially vertical direction may be indicative of a user picking up the mobile device for use, and may be commonly followed by unlocking the mobile device. The accelerometer information may be used to recreate the accelerometer signal that invoke a function, or to indicate to the unauthorized software to monitor a feature of the device in response to a specific movement to glean more information that is likely to be available based on a correlation of the movement and the function to likely follow. Monitoring the mobile device conditions and events at the high level for accelerometer hardware may aid in determining, for example, whether unauthorized function calls are occurring, or unauthorized recordings of actions are occurring.

Examples of mobile device conditions and events at a high level that may be selected in block 902 and observed in block 904 for synchronization hardware include the number of times and when changes to the synchronization settings occur. Unauthorized software may modify synchronization settings, such as the destination server, black-listed and white-listed servers, and location and network settings. Changes to the synchronization settings may direct the synchronization procedures to send data to an unauthorized destination, reduce the protection level of the data being transmitted, or cause synchronization errors. Monitoring the mobile device conditions and events at the high level for synchronization hardware may aid in determining, for example, whether data may be compromised by transmitting to the unauthorized destination or transmitting the data in a less secure format, or whether synchronization procedures are failing.

Examples of mobile device conditions and events at a high level that may be selected in block 902 and observed in block 904 for dual SIM hardware include the number of times and/or when information flows between secure and unsecure SIM cards occurs. Mobile devices may contain multiple SIM cards for different purposes. For example, a mobile device may have an unsecure SIM card formatted for regular use of the communication features of the mobile device, and a secure SIM card to provide greater security for transmission and storage of sensitive information. A secure SIM card may invoke encrypting data transmitted from and stored on the mobile device, and invoke decrypting data received by the mobile device. Mobile devices that use secure SIM cards often transmit data to other secure devices with secure SIM cards. The transfer of data from the secure SIM card to the unsecure SIM card may be less common, because the data may then be more easily accessed by an unauthorized party. The number of times data transmissions occur from the secure SIM card to the unsecure SIM card may be indicative of unauthorized transfers of secure data. For example, the number of times the secure SIM card places a call to the unsecure SIM card. The secure and unsecure SIM cards may also be on different mobile devices. Monitoring the mobile device conditions and events at the high level for dual SIM hardware may aid in determining, for example, whether unauthorized transfers of data are occurring.

Examples of mobile device conditions and events at a high level that may be selected in block 902 and observed in block 904 for radio interface hardware include the number of times, when, and which radio interfaces are active, and the correlation of traffic statistics across the radio interfaces. Unauthorized software may activate various radio interfaces on the mobile device to execute unauthorized data transfers or to locate the mobile device. Also, the mobile device may be used by unauthorized software to make multiple repeated requests for access to or to communicate with a remote server or other device as part of a denial-of-service (DoS) or distributed denial-of-service (DDoS) attack. The correlation of the traffic statistics across the radio interfaces may show when a radio interface has a high level of traffic compared to the other radio interfaces. Greater disparities in traffic levels may occur at different times, such as when the mobile device is otherwise idle and the other radio interfaces have little traffic. A high level of traffic on a particular radio interface may be indicative of unauthorized use of the radio interface as part of some such attack. Monitoring the mobile device conditions and events at the high level for radio interface hardware may aid in determining, for example, whether unauthorized software is causing unauthorized data transmissions or to involve the mobile device in attack on another device.

Examples of mobile device conditions and events at a high level that may be selected in block 902 and observed in block 904 for features unrelated related to any specific hardware include the number of times and when: a motion state or a non-motion state is read; a combination of location information and Bluetooth or NFC information are accessed; a connectivity state is checked; microphone functionality is accessed or used; a combination of a camera and communication functions are used; communication NFC details are accessed; and a combination of no prior user interaction and a camera or microphone function are used. Motion state information could be used to determine whether the mobile device is moving, and potentially its speed. For example, a slow rate of movement may indicate that a user is standing with the mobile device because while standing the user may make slow and short movements. Faster movements may indicate that the user of the mobile device may be walking, driving, flying, etc. Similarly, a non-motion state may indicate a relative lack of movement of the mobile device. For example, infrequent or lack of movement of the mobile device may indicate that the mobile device is placed on a table or in a docking device, in a pocket or holster of a user who is staying relatively stationary, such as sitting in a chair. Tracking access to this information may aid in determining, for example, whether unauthorized access is occurring to potentially gather information on the movements of the mobile device.

The location or Bluetooth or NFC information alone may be used to identify the location of the mobile device, but the combination of location information and Bluetooth or NFC information may be used to determine the location of the mobile device with increased accuracy. Multiple sources of information to determine the location may be used to determine the correctness of one or more of the information sources, or used in combination to locate the mobile device in an area and then used to further pinpoint the device within the area. For example, location information may be less accurate in a shopping mall than out in the open where multiple cell towers and GPS satellites may be observed, and it may not be possible to identify a vertical position of the mobile device from the location information that may be gleaned from a mobile device within a mall. However, knowing the general location of the mobile device, Bluetooth or NFC information may indicate that a connection to a network has been established by the mobile device via a transceiver within certain stores. The combination of knowing that the mobile device is generally in the shopping mall and that the mobile device is connected to a network belonging to a particular store may allow the mobile device to be located with precision within the shopping mall, possibly by comparing the information from the mobile device with information about the location. Tracking access to this information may aid in determining, for example, whether unauthorized access is occurring, potentially to determine the location of the mobile device.

The connectivity state may indicate when the mobile device attempts to or is connected to a network. This information may be used to locate the mobile device, track the data transmitted over the network connection to and from the mobile device, and to transmit data over the network connection. The connectivity state may also indicate the communication network that the mobile device is attempting to connect to or is connected to supports, such as cellular, Wi-Fi, Bluetooth, SMS, or any other type of communication with which the mobile device has the necessary radio transceivers. The mobile device location may be determined based on the coverage of the network to which the mobile device is connected, and a series of connections may be used to track the movements of the mobile device over time. The data transmitted to and from the mobile device may be tracked when a connection state indicates an attempt to connect or a connection to a network, as the connection state may trigger software to begin unauthorized monitoring of the data being sent and received via the connection. Similarly, the connection state may prompt software to use the connection to make unauthorized transmissions and receptions of data over the connection. Tracking access to the connection state may aid in determining, for example, whether unauthorized tracking, monitoring of data transmission, or use of the connection is occurring.

The microphone functionality may be used to record sounds directed to or in the environment around the mobile device. The sound recordings may be used to store conversations, identify participants of the conversations, or echolocate the mobile device within its environment. The microphone functionality may be subject to unauthorized use or monitoring when legitimately used. Tracking access or use of the microphone functionality of the mobile device may aid in determining, for example, whether unauthorized monitoring of the sound captured by the microphone is occurring.

The combination of the camera function and the communication function usage may be used to capture unauthorized light sensing or image data, which may be transmitted to a destination external to the mobile device, like another mobile device or a cloud server. This data may be used to locate the mobile device, for example, by analyzing the light sensing data, either alone or in combination with other data, the mobile device may be determine to be located in the user's pocket, indoors, outdoors, etc. Image analysis may also be used to locate the mobile device. The images may also be stored on a device external to the mobile device. Monitoring the use of the camera and communication functions may aid in determining, for example, whether unauthorized use of these functions is occurring.

The communication NFC details may be closely related to electronic commerce information. Access to the communication NFC details may be used to identify retailers and where, when, how and, what purchases are made. It may also be used to access sensitive information about the authorizations for making the purchases that could be used to make unauthorized purchases. Similarly, communication NFC details may indicate check-ins at secure areas, and identify locations, times, and authorizations for those check-ins. Tracking the access of the communication NFC details may aid in determining, for example, whether unauthorized monitoring of sensitive information communicated over NFC is occurring.

As described above, camera or microphone functions, may be used for numerous unauthorized uses. The combination of the lack of user interaction with the mobile device just before camera or microphone functions are used is an unlikely combination of events in view of normal user interaction with the mobile device. This is because users typically interact with the mobile device through a user interface on the mobile device to initiate the camera or microphone functions. Even in instances of sensor triggered use of these functions, such a motion or sound detection setting, which may be suspended or idle for periods of time would likely require user interaction to initially setup the use of these settings. By tracking the combination of the use of the camera or microphone functions and the lack of user interaction with the mobile device just before these camera or microphone functions are used, a mobile device may identify the unauthorized use of these functions.

Figure 9B:
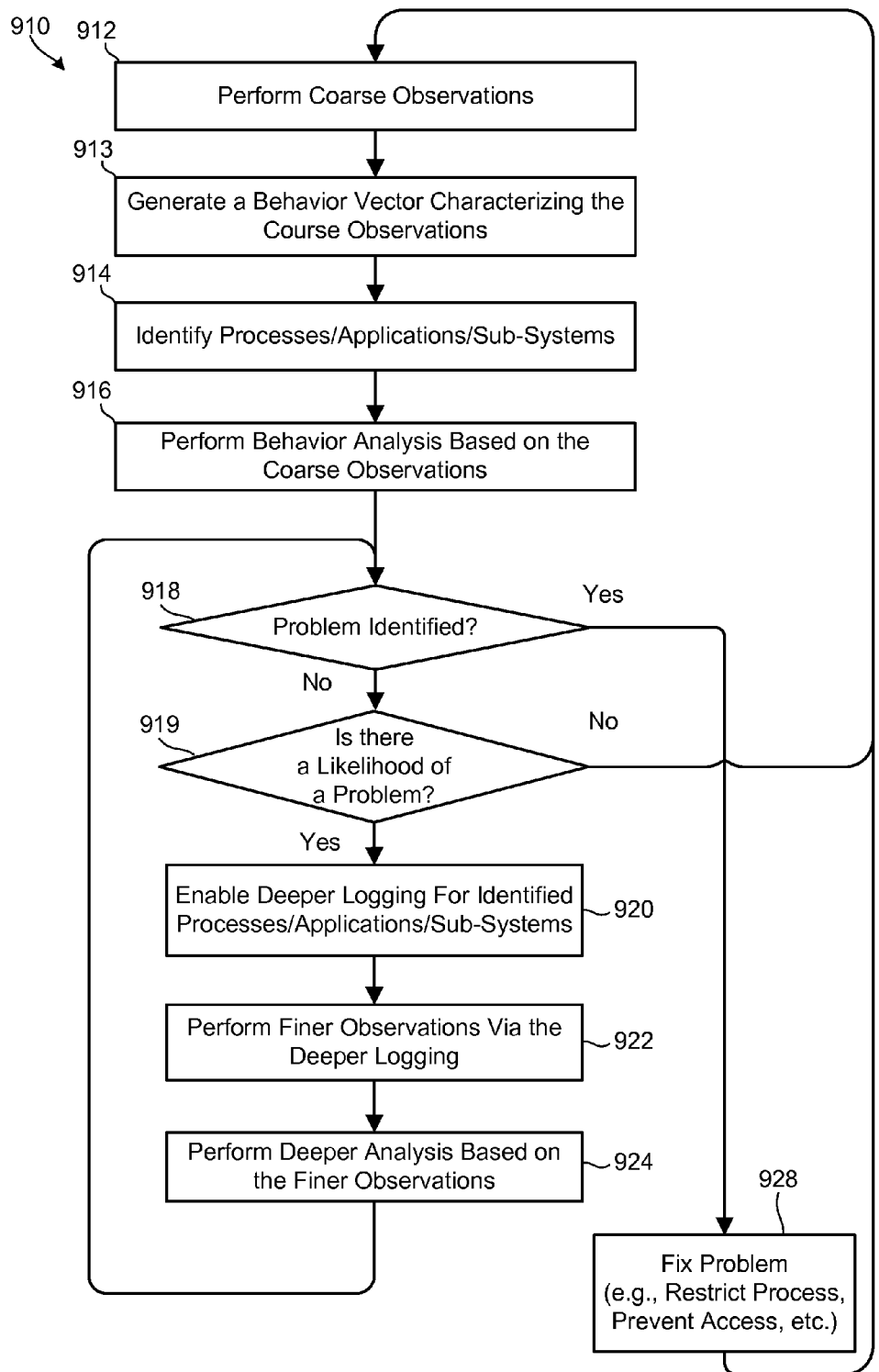
FIG. 9B is a process flow diagram illustrating another aspect method for performing adaptive observations on mobile devices.

FIG. 9B illustrates another example method 910 for performing dynamic and adaptive observations in accordance with an aspect. In block 912, the mobile device processor may perform coarse observations by monitoring/observing a subset of large number factors/behaviors that could contribute to the mobile device's degradation. In block 913, the mobile device processor may generate a behavior vector characterizing the coarse observations and/or the mobile device behavior based on the coarse observations. In block 914, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 916, the mobile device processor may perform behavioral analysis operations based on the coarse observations. In determination block 918, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 918="Yes"), in block 928, the processor may initiate a process to correct the behavior and return to block 912 to perform additional coarse observations.

When the mobile device processor determines that the suspicious behaviors or potential problems can not be identified and/or corrected based on the results of the behavioral analysis (i.e., determination block 918="No"), in determination block 919 the mobile device processor may determine whether there is a likelihood of a problem. In an embodiment, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 919="No"), the processor may return to block 912 to perform additional coarse observations.

When the mobile device processor determines that there is a likelihood that suspicious behaviors or potential problems exist and/or are detectable (i.e., determination block 919="Yes"), in block 920, the mobile device processor may perform deeper logging/observations or final logging on the identified subsystems, processes or applications. In block 922, the mobile device processor may perform deeper and more detailed observations on the identified subsystems, processes or applications. In block 924, the mobile device processor may perform further and/or deeper behavioral analysis based on the deeper and more detailed observations. In determination block 918, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 918="No"), the processor may repeat the operations in blocks 920-924 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 918="Yes"), in block 928, the mobile device processor may perform operations to correct the problem/behavior, and the processor may return to block 912 to perform additional operations.

In an aspect, as part of blocks 912-928 of method 910, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
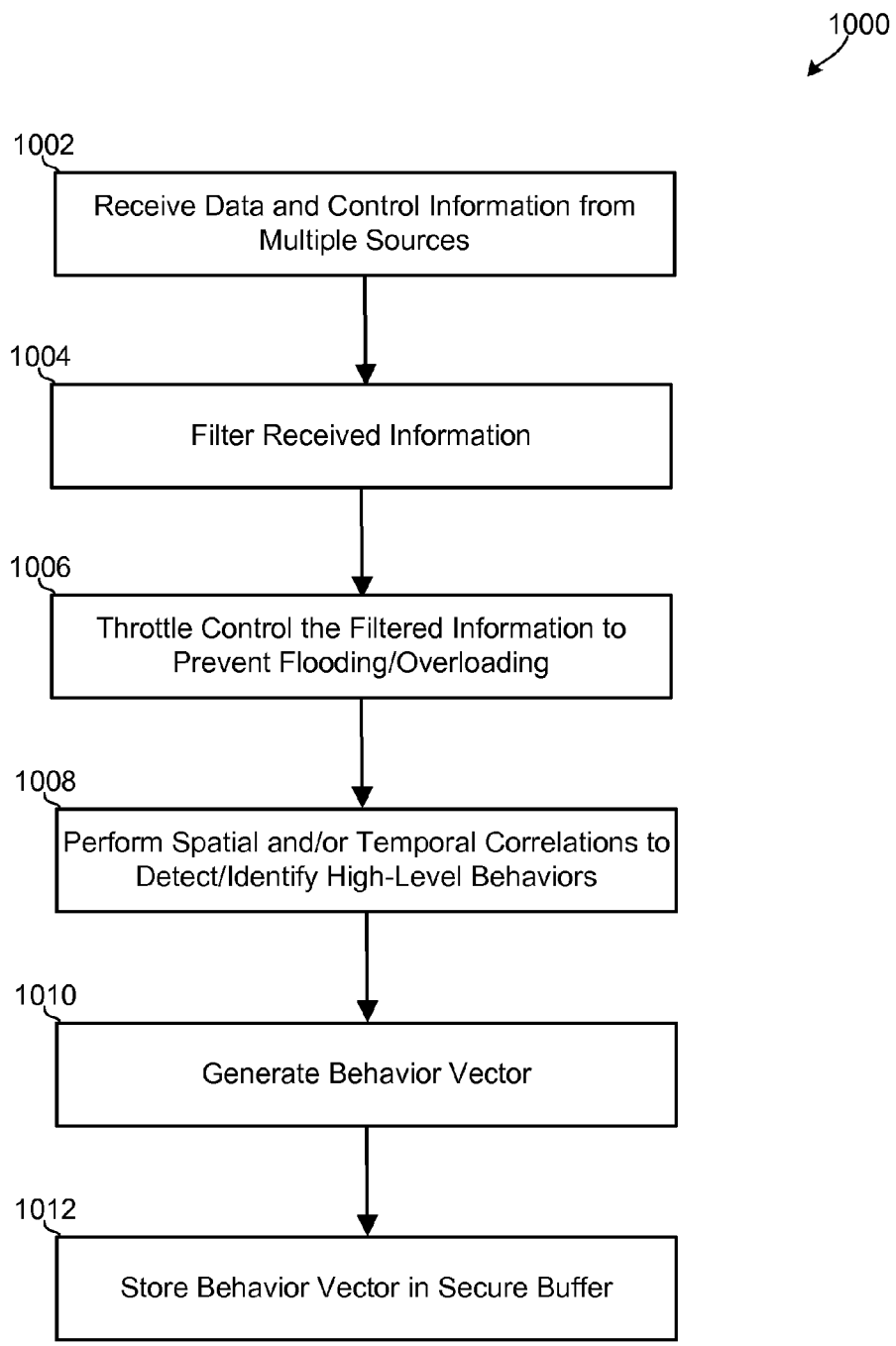
FIG. 10 is a process flow diagram illustrating another aspect method for performing adaptive observations on mobile devices.

FIG. 10 illustrates an example observer method 1000 for performing dynamic and adaptive observations on a mobile device processor in accordance with an aspect. The observer method 1000 may be implemented as part of an observer module in the mobile device's kernel space, user space, or a combination thereof. In block 1002, the observer module operating on the processor may receive data, control, and/or context information from various sources, which may include an analyzer unit (e.g., analyzer module 204 described in FIG. 2), application APIs, Driver APIs, kernel threads, user threads, processes, programs, mobile device sensors, etc. In block 1004, the observer module operating on the processor may adaptively and intelligently filter the received information to generate a smaller subset of the received information. In block 1006, the observer module operating on the processor may throttle control the filtered information to control/prevent flooding or overloading. In block 1008, the observer module operating on the processor may perform spatial and temporal correlations to detect/identify high level behaviors that may cause the device to perform at sub-optimal levels. In block 1010, the observer module operating on the processor may generate a behavior vector that describes the behaviors of particular process, application, or sub-system. In block 1012, the observer module operating on the processor may store the generated behavior vector in a secure buffer.

Figure 11A:
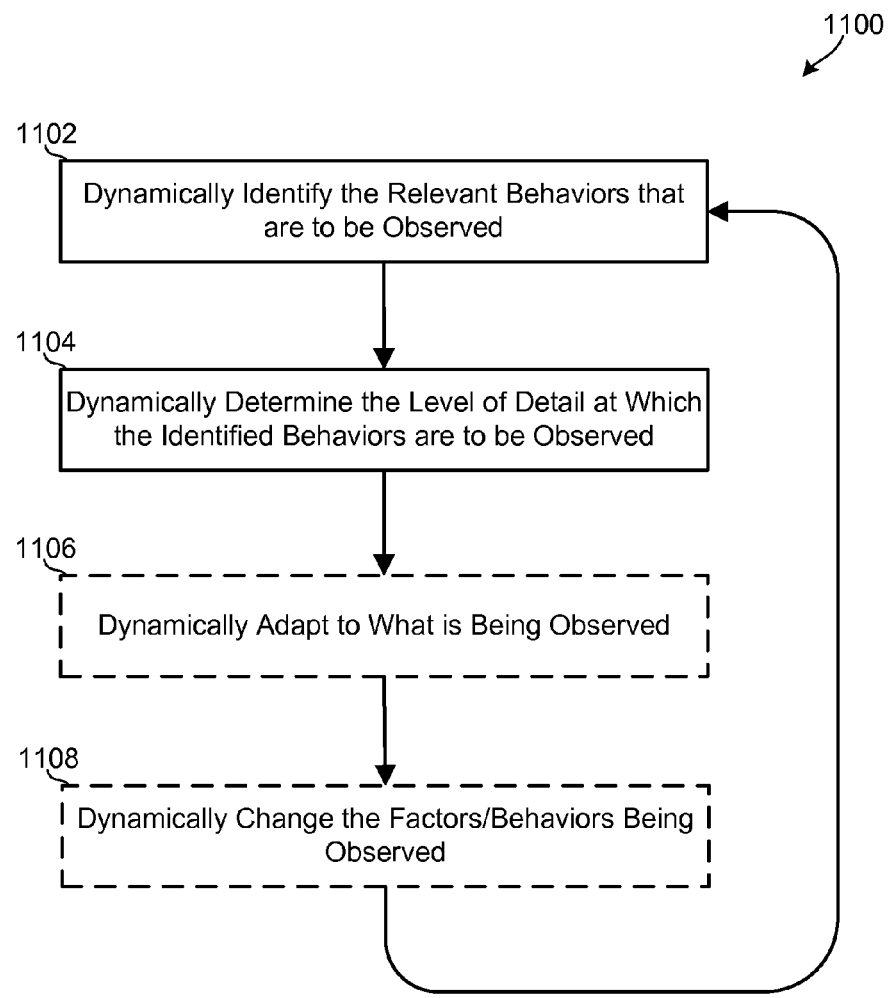
FIGS. 11A-11C are process flow diagrams illustrating further aspect methods for performing adaptive observations on mobile devices.

FIG. 11A illustrates another example method 1100 for performing dynamic and adaptive observations by a mobile device processor in accordance with another aspect. In block 1102, the mobile device processor may dynamically identify the relevant behaviors that are to be observed on the mobile device. In block 1104, the mobile device processor may dynamically determine the level of detail at which the identified behaviors are to be observed. In optional block 1106, the mobile device processor may dynamically adapt to what is being observed. In optional block 1108, the mobile device processor may dynamically change or update the parameters, factors, behaviors, processes, applications, and/or subsystems that are to be observed. The operations of blocks 1102-1108 may be repeated continuously or as is necessary to improve the mobile device performance (e.g., battery power consumption, processing speed, network communication speeds, etc.).

Figure 11B:
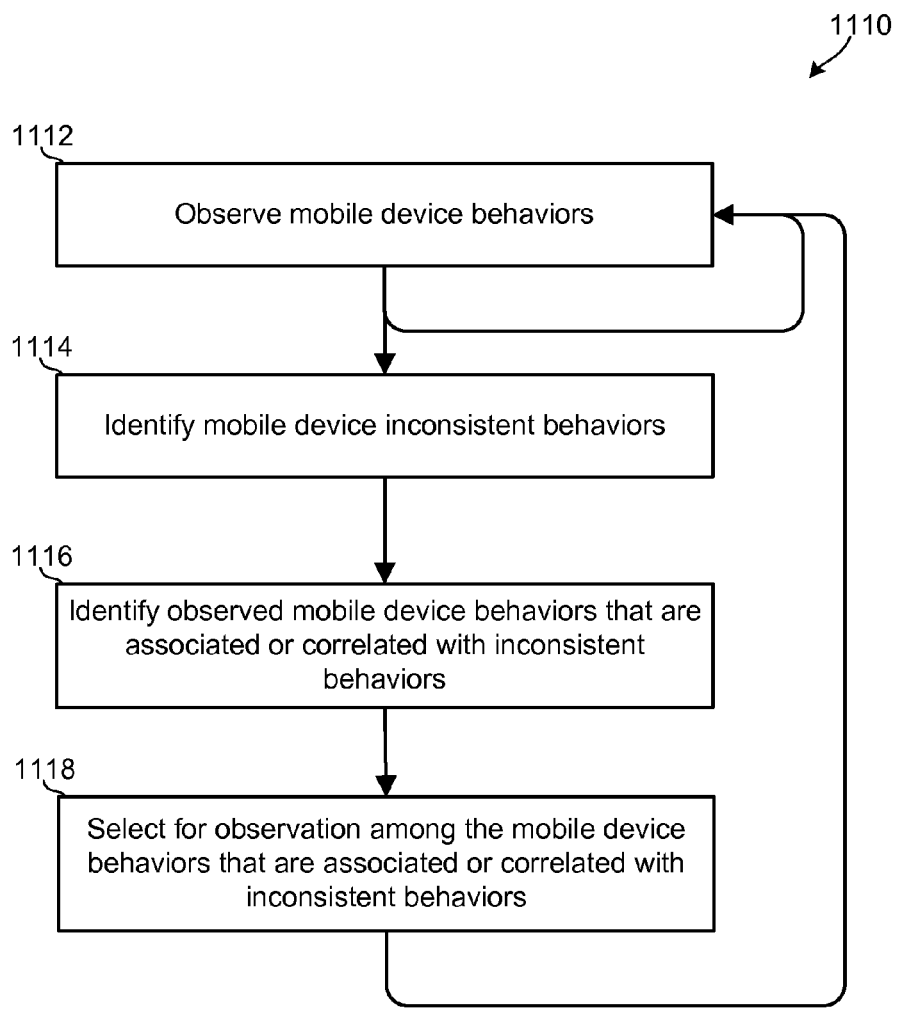

FIG. 11B illustrates an aspect method 1110 that may be performed as part of the operations of block 1102 described above with reference to FIG. 11A. In order to dynamically identify relevant behaviors, the mobile device processor may observe any of the mobile device behaviors described above over a period of time in block 1112. This observation may be for a set period of time or may be cumulative, such as in a continuous learning process. Thus, the longer that the mobile device operates, the more behavioral observations may be collected. In block 1114 the processor may identify inconsistent behaviors of the mobile device, which may be indicative of a performance limiting condition. This may include performing any of the methods described herein. The inconsistent behaviors may be suspicious or potentially performance-degrading mobile device behaviors.

In block 1116, the mobile device processor may correlate or identify associations between the observed mobile device behaviors and identify inconsistent behaviors in order to identify correlations or patterns. For example, the processor may identify those observed mobile device behaviors that occur only during or immediately before identified inconsistent behaviors. As another example, the processor may identify those observed mobile device behaviors that occur frequently (though not necessarily always) during or immediately before identified inconsistent behaviors. As a further example, the processor may identify sets of observed behaviors which only or frequently occur together when inconsistent behaviors are identified. In block 1118, the processor may select mobile device behaviors for observation from among the subset of behaviors that the processor has identified as associated or correlated with inconsistent behaviors. Thus, the selection of mobile device behaviors for observation may be dynamic, and the selection process may improve over time as more mobile device behaviors are observed and more inconsistent behaviors are identified. In this manner, the longer the mobile device operates, the better the processor may be able to identify those few behaviors that are most closely correlated or associated with inconsistent or undesirable behaviors. That is, the longer that the mobile device processor observes these mobile device behaviors, the more accurate its classifications of suspicious or potentially performance-degrading mobile device behaviors become.

Figure 11C:
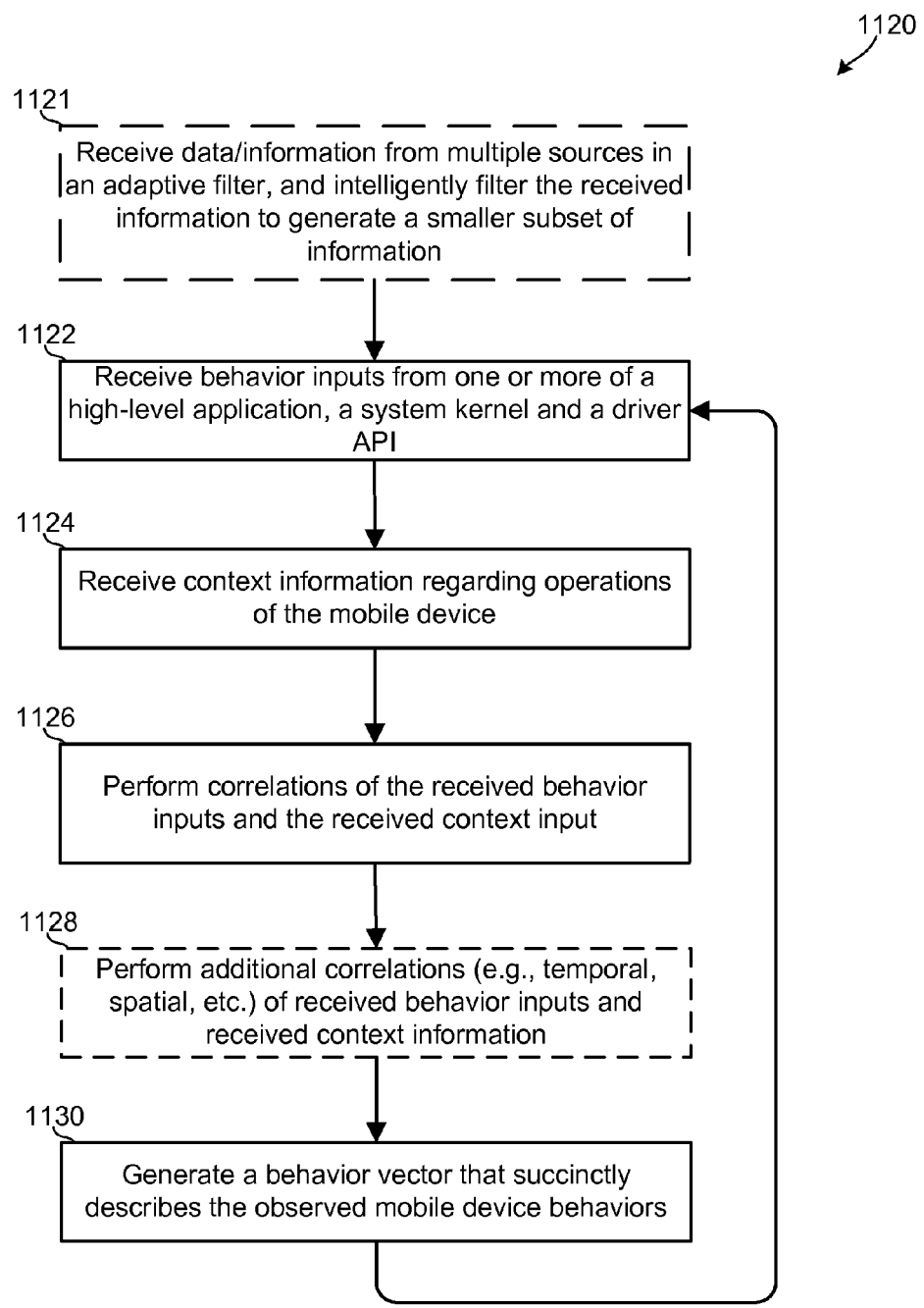

FIG. 11C illustrates an aspect method 1120 that may be performed as part of the operations of block 1116 described above with reference to FIG. 11B. As part of the process of identifying correlations between observed mobile device behaviors and inconsistent behaviors, the processor may receive behavior inputs from one or more of a high-level application, the system kernel, and a driver API in block 1122. In an embodiment, these inputs may first be filtered by an adaptive filter that screens out those inputs that the processor can determine are not associated with suspicious or inconsistent behaviors in optional block 1121.

In block 1124, the processor may receive context information regarding ongoing operations of the mobile device as described above. In block 1126, the processor may perform correlations (e.g., spatial correlations, etc.) of the received behavior inputs and the received context information as described above. Optionally, the processor may also perform additional correlations (e.g., temporal correlations) of received behavior inputs, and receive context information in order to identify those observed behaviors that are related in optional block 1128. For example, the processor may perform temporal correlations to identify behaviors that are related in time (e.g., preceding closely in time versus simultaneous) with inconsistent behaviors. Using this information, the processor may generate a behavior vector that succinctly describes the observed mobile device behaviors in block 1130 as described above. Such a behavioral vector may include information collected from APIs at various operational software levels and from various software/hardware modules of the mobile device.

A behavior vector generated in block 1130 may include, for example, information related to one or more of library API calls, system calls, file-system and network sub-system operations, sensor device state changes, file system activity, network activity, telephone activity, memory access operations, a state of the mobile device, a power on/off state of an electronic display, a locked/unlocked state of the mobile device, the amount of battery power remaining, inter-process communications (IPC), driver statistics, and hardware counters.

A behavior vector generated in block 1130 may have a vector data structure that includes a series of numbers, each of which signifies feature or behavior of the mobile device. Such numbers may include binary flags (i.e., a single bit having a value of either 1 or 0), such as to indicate whether a camera of the mobile device is in use or not, counter values, such as amount of network traffic that has been generated by the mobile device or a number of Internet messages that have been sent by the mobile device within a period of time.

A behavior vector generated in block 1130 may also include one or more of call information, text messaging information, media messaging information, user account information, location information, camera information, accelerometer information, and browser information. As discussed above, the information used to generate the behavior vector may include information collected at an application level of the mobile device, at a radio level of the mobile device, at a sensor level of the mobile device (e.g., a camera or microphone), at a hardware level, at a driver level, and at a high level.

Figure 12:
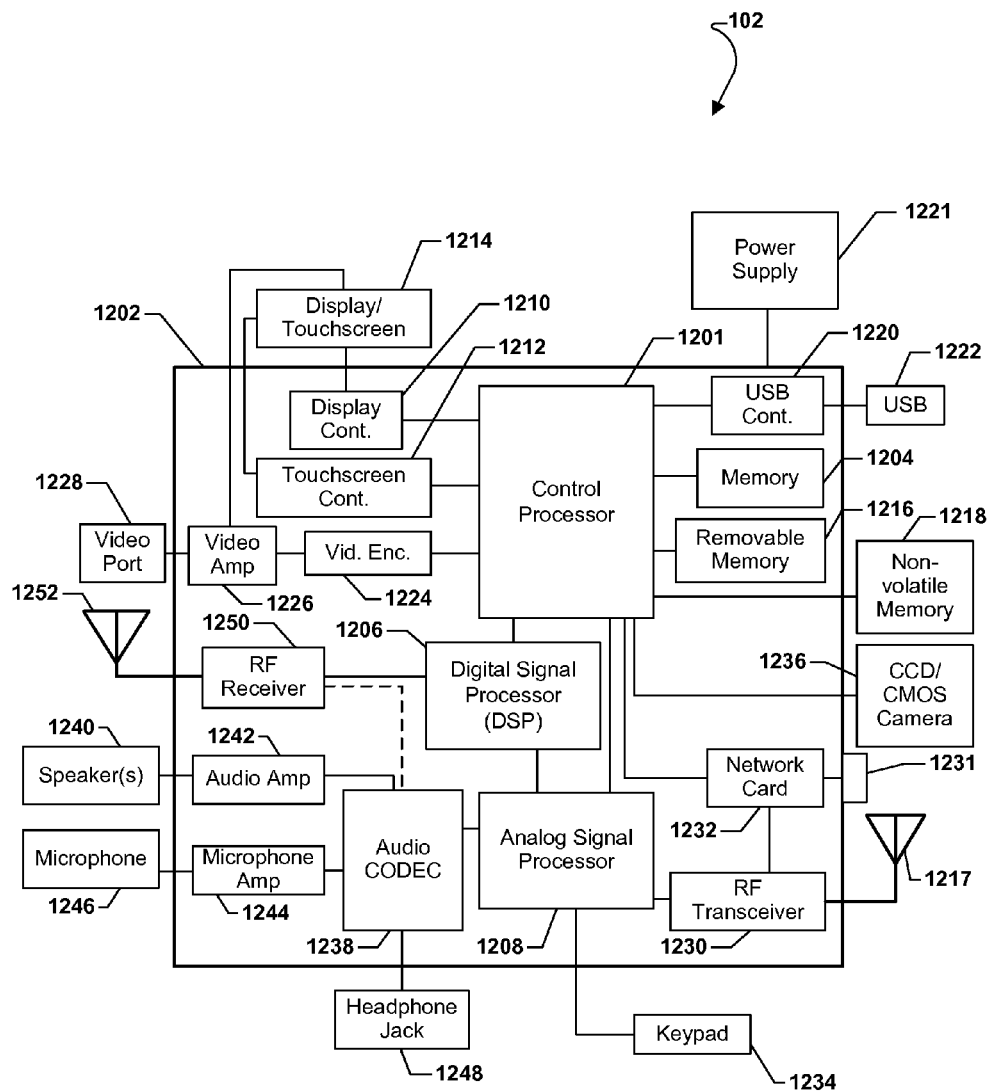
FIG. 12 is a component block diagram of mobile device suitable for use with the various aspects.

Example components and modules of an exemplary, non-limiting aspect of such a mobile computing device 102 are illustrated in FIG. 12. A mobile computing device 102 may include a circuit board 1202 of electronic components, some or all of which may be integrated into an on-chip system, that includes a control processor 1201 coupled to memory 1204. The control processor 1201 may further be coupled to a digital signal processor 1206 and/or an analog signal processor 1208, which also be coupled together. In some embodiments, the control processor 1201 and a digital signal processor 1206 may be the same component or may be integrated into the same processor chip. A display controller 1210 and a touchscreen controller 1212 may be coupled to the control processor 1201 and to a display/touchscreen 1214 within or connected to the mobile computing device 102.

The control processor 1201 may also be coupled to removable memory 1216 (e.g., a secure digital (SD) memory or SIM card in the case of mobile computing devices) and/or to external memory 1218, such as one or more of a disk drive, compact disc (CD) drive, and a digital versatile disc (DVD) drive. The control processor 1201 may also be coupled to a Universal Serial Bus (USB) controller 1220 which couples to a USB port 1222. Other devices (not shown) may be coupled to the control processor 1201 through the USB port 1222 and USB controller 1220. For example, an external microphone (not shown) may be coupled to the control processor 1201 via the USB port 1222 and USB controller 1220. The various aspects may include monitoring of processes involving external hardware via the USB port 1222 and USB controller 1220.

In various aspects, a power supply 1221 may be coupled to the circuit board 1202 through the USB controller 1220 or through different electrical connections to provide power (e.g., DC power) to the various electronic components.

The control processor 1201 may also be coupled to a video encoder 1224, e.g., a phase alternating line (PAL) encoder, a sequential couleur a memoire (SECAM) encoder, or a national television system(s) committee (NTSC) encoder. Further, the video encoder 1224 may be coupled to a video amplifier 1226 which may be coupled to the video encoder 1224 and the display/touchscreen 1214. Also, a video port 1228 may be coupled to the video amplifier 1226 to enable connecting the mobile computing device 102 to an external monitor, television or other display (not shown).

The control processor 1201 may be coupled to a radio frequency interface hardware component 1230, such as via an analog signal processor 1208. The radio interface hardware component 1230 may be coupled to an RF antenna 1217 for transmitting and receiving RF signals. In the example illustrated in FIG. 12, a single radio interface hardware component 1230 is configured to support multiple different RF technologies and protocols. For example, the radio interface hardware component 1230 may be a multifunction radio module that is configured to support RF communications over multiple frequencies, networks and protocols, including for example, cellular telephone (e.g., G-3, UMTS, CDMA, etc.), Wi-Fi, WiMax, Near Field Communication (NFC), and Bluetooth, or a subset of those example protocols.

While FIG. 12 shows a single radio interface hardware component 1230, multiple different types of radio interface hardware component and/or multifunction RF transceivers may be coupled to the control processor 1201 in order to transmit and receive communication signals of a number of different wireless communication protocols including, for example, cellular telephone (e.g., G-3, UMTS, CDMA, etc.), Wi-Fi, WiMax, Near Field Communication (NFC), and Bluetooth. Also, the control processor 1201 may be coupled to external hardware (e.g., Bluetooth headsets or microphones) and to external systems (e.g., a point of sale device via an NFC RF transceiver), as well as Internet servers and systems via radio interface hardware component 1230 and RF antenna 1218. The various aspects may include monitoring of processes involving external hardware, systems and services connected via the radio interface hardware component(s) 1230 and RF antenna 1218.

The control processor 1201 may further be coupled to a network card 1232 which may be coupled to a network connector 1231 and/or the RF transceiver 1230 and configured to enable communications via an external network (e.g., local area networks, the Internet, an intranet, Wi-Fi networks, Bluetooth networks, personal area network (PAN) etc.) The network card 1232 may be in the form of a separate chip or card, or may be implemented as part of the control processor 1201 or the RF transceiver 1230 (or both) as a full solution communication chip.

A number of analog devices may be coupled to the control processor 1201 via the analog signal processor 1208, such as a keypad 1234. In other implementations, a keypad or keyboard may include its own processor so that the interface with the control processor 1201 may be via direct connection (not shown), via a network connection (e.g., via the network card), or via the USB port 1222.

In some implementations, a digital camera 1236 may be coupled to the control processor 1201. In an exemplary aspect, the digital camera 1236 may be a charge-coupled device (CCD) camera or a complementary metal-oxide semiconductor (CMOS) camera. The digital camera 1236 may be built into the mobile computing device 102 or coupled to the device by an external cable.

In some implementations, an audio CODEC 1238 (e.g., a stereo CODEC) may be coupled to the analog signal processor 1208 and configured to send sound signals to one or more speakers 1240 via an audio amplifier 1242. The audio CODEC 1238 may also be coupled to a microphone amplifier 1244 which may be coupled to a microphone 1246 (e.g., via a microphone jack). A headphone jack 1248 may also be coupled to the audio CODEC 1238 for outputting audio to headphones.

In some implementations, the mobile computing device 102 may include a separate RF receiver circuit 1250 which may be coupled to an antenna 1252 for receiving broadcast wireless communication signals. The receiver circuit 1250 may be configured to receive broadcast television signals (e.g., EBMS broadcasts), and provide received signals to the DSP 1206 for processing. In some implementations, the receiver circuit 1250 may be configured to receive FM radio signals, in which case the received signals may be passed to the Audio CODEC 1238 for processing.

In an aspect, processor-executable instructions for accomplishing one or more of the method operations described above may be stored in the internal memory 1204, removable memory 1216 and/or non-volatile memory 1218 (e.g., as on a hard drive, CD drive, or other storage accessible via a network). Such processor-executable instructions may be executed by the control processor 1201 in order to perform the methods described herein.

Figure 13:
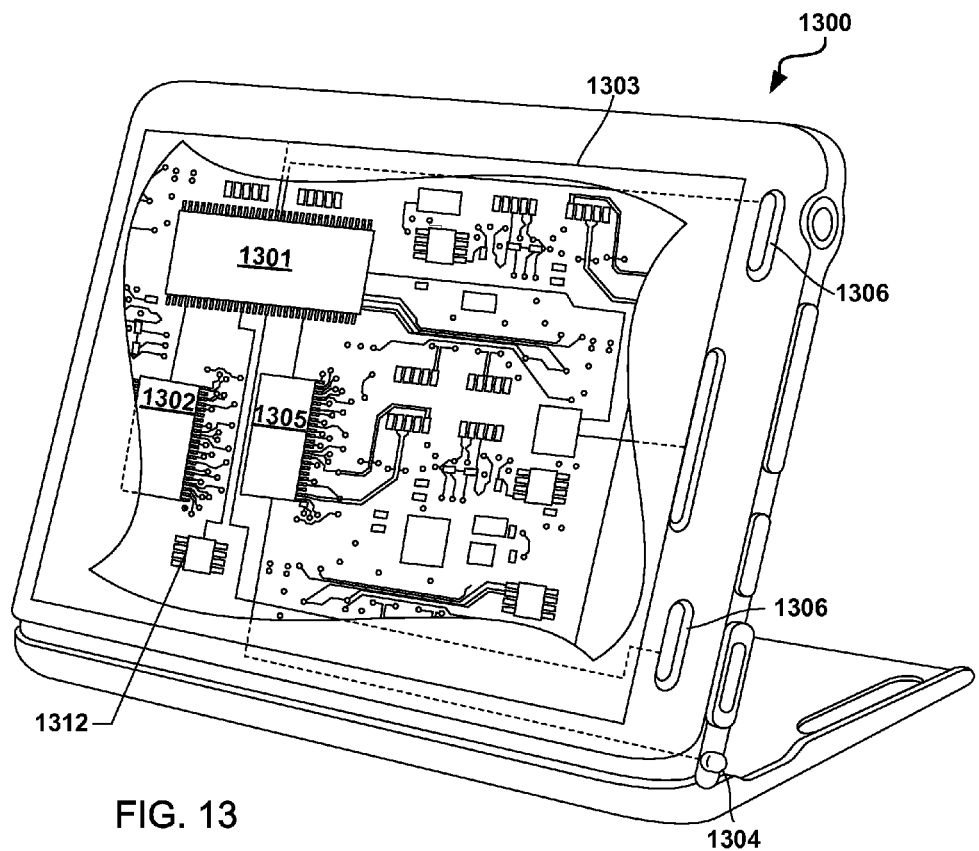
FIG. 13 is an illustration of an example mobile device suitable for use with the various aspects.

The various aspects may be implemented on a variety of mobile computing devices, an example of which is illustrated in FIG. 13 in the form of a smartphone. A smartphone 1300 may include a processor 1301 coupled to internal memory 1302, a display 1303, and to a speaker. Additionally, the smartphone 1300 may include an antenna 1304 for sending and receiving electromagnetic radiation that may be connected to a wireless data link and/or cellular telephone transceiver 1305 coupled to the processor 1301. Smartphone 1300 typically also include menu selection buttons or rocker switches 1306 for receiving user inputs.

A typical smartphone 1300 also includes a sound encoding/decoding (CODEC) circuit 1312, which digitizes sound received from a microphone into data packets suitable for wireless transmission and decodes received sound data packets to generate analog signals that are provided to the speaker to generate sound. Also, one or more of the processor 1301, wireless transceiver 1305 and CODEC circuit 1312 may include a digital signal processor (DSP) circuit (not shown separately). As mentioned above, the processor 1301 may also be coupled to external hardware through a data network wireless transceiver 1307, such as a Wi-Fi transceiver, a Bluetooth transceiver or an NFC transceiver.

Figure 14:
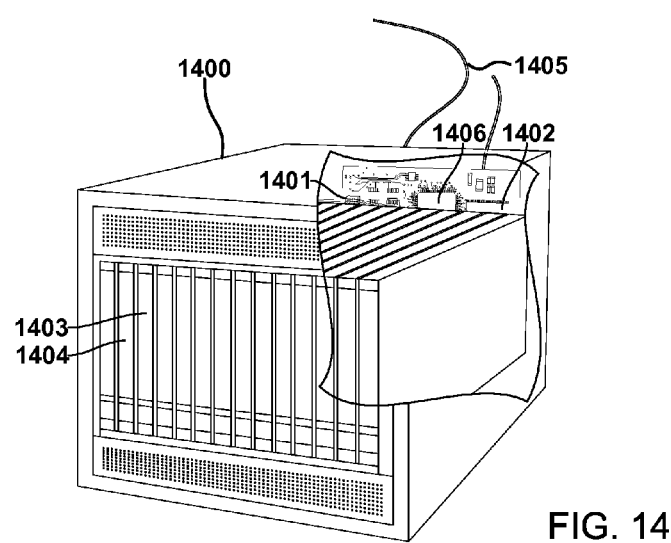
FIG. 14 is an illustration of an example server computer suitable for use with the various aspects.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory 1403, such as a disk drive. The server 1400 may also include a floppy disc drive, compact disc (CD) or DVD disc drive 1411 coupled to the processor 1401. The server 1400 may also include network access ports 1404 coupled to the processor 1401 for establishing data connections with a network 1405, such as a local area network coupled to other broadcast system computers and servers.

The processors 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1302, 1402, 1403 before they are accessed and loaded into the processor 1301, 1401. The processor 1301, 1401 may include internal memory sufficient to store the application software instructions.

As used in this application, the terms "component," "module," "system," "engine," "manager," and the like are intended to include a computer-related entity, such as, but not limited to, hardware, firmware, a combination of hardware and software, software, or software in execution, which are configured to perform particular operations or functions. For example, a module or component may be, but are not limited to, a process running on a processor, a thread of execution, an object, an executable, a software application program, a processor, and/or a computer. By way of illustration, both an application running on a computing device and the computing device may be referred to as a component. In addition, one or more components or modules may reside within a process and/or thread of execution and may be localized on one processor or core and/or distributed between two or more processors or cores. In addition, these components/modules may execute from various non-transitory computer readable media having various instructions and/or data structures stored thereon. Modules may communicate by way of local and/or remote processes, function or procedure calls, electronic signals, data packets, memory read/writes, and other known computer, processor, and/or process related communication methodologies.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for behavior tracking in a mobile device using behavioral vectors, the method comprising:
   determining in a processor of the mobile device a feature that is to be observed in the mobile device in order to identify a suspicious mobile device behavior;
   adaptively observing the determined feature in the mobile device by collecting behavior information from an instrumented component that is associated with the determined feature;
   generating a vector data structure that describes the collected behavior information via a plurality of numbers; and
   performing behavior analysis operations that include applying a classifier model that includes decision nodes to the vector data structure to identify the suspicious mobile device behavior.

2. The method of claim 1, wherein adaptively observing the determined feature by collecting the behavior information from the instrumented component that is associated with the determined feature comprises one of:
   monitoring the instrumented component to detect access or use of call history information without prior user interaction;
   monitoring the instrumented component to detect the access and use of a proximity sensor;
   monitoring access, use, or communication of voicemail information; and
   monitoring the instrumented component to identify applications that move to a foreground of an electronic display of the mobile device.

3. The method of claim 1, wherein adaptively observing the determined feature by collecting the behavior information from the instrumented component that is associated with the determined feature comprises monitoring universal serial bus (USB) communications.

4. The method of claim 1, wherein adaptively observing the determined feature by collecting the behavior information from the instrumented component that is associated with the determined feature comprises monitoring browser-based video, audio, file upload, or camera operations.

5. The method of claim 1, wherein adaptively observing the determined feature by collecting the behavior information from the instrumented component that is associated with the determined feature comprises monitoring battery usage levels or patterns.

6. The method of claim 1, wherein adaptively observing the determined feature by collecting the behavior information from the instrumented component that is associated with the determined feature comprises one of:
monitoring a software application's communication of information after reading a shared data file; and
monitoring the software application's communication of information after reading a memory card.

7. The method of claim 1, wherein adaptively observing the determined feature by collecting the behavior information from the instrumented component that is associated with the determined feature comprises one of:
monitoring opening or closing of a browser software application; and
monitoring writing or deleting browser information.

8. The method of claim 1, wherein adaptively observing the determined feature by collecting the behavior information from the instrumented component that is associated with the determined feature comprises monitoring adding or removing of contacts to a contacts list of the mobile device.

9. The method of claim 1, wherein adaptively observing the determined feature by collecting the behavior information from the instrumented component that is associated with the determined feature comprises monitoring the instrumented component to detect a deletion of text or a multimedia message.

10. The method of claim 1, wherein adaptively observing the determined feature by collecting the behavior information from the instrumented component that is associated with the determined feature comprises monitoring an access or use of a motion coprocessor.

11. The method of claim 1, wherein adaptively observing the determined feature by collecting the behavior information from the instrumented component that is associated with the determined feature comprises monitoring a software application's interactions with a power management system.

12. The method of claim 1, wherein adaptively observing the determined feature by collecting the behavior information from the instrumented component that is associated with the determined feature comprises monitoring changes in a power state of an electronic display of the mobile device.

13. The method of claim 1, wherein adaptively observing the determined feature by collecting the behavior information from the instrumented component that is associated with the determined feature comprises monitoring one or more of usage patterns of a processor, usage patterns of memory, usage patterns of a battery, usage patterns of a sensor, communication patterns, and file access patterns.

14. The method of claim 1, wherein adaptively observing the determined feature by collecting the behavior information from the instrumented component that is associated with the determined feature comprises one of
monitoring a pairing with a Bluetooth device;
monitoring near field communication (NFC) multipurpose Internet mail extension (MIME) type objects or communications;
communication via peer-to-peer near NFC links; and
monitoring a sending of an NFC intent.

15. The method of claim 1, wherein adaptively observing the determined feature by collecting the behavior information from the instrumented component that is associated with the determined feature comprises one of:
monitoring an installation of a widget in the mobile device;
monitoring an installation of a shortcut in the mobile device;
monitoring communications with a Linux device or virtual file.

16. The method of claim 1, wherein adaptively observing the determined feature by collecting the behavior information from the instrumented component that is associated with the determined feature comprises monitoring applications watching for or receiving a boot complete event.

17. The method of claim 1, wherein adaptively observing the determined feature by collecting the behavior information from the instrumented component that is associated with the determined feature comprises monitoring the instrumented component to detect display of an invisible widget.

18. The method of claim 1, wherein adaptively observing the determined feature by collecting the behavior information from the instrumented component that is associated with the determined feature comprises monitoring for applications coming into a foreground in combination with displaying a graphical user interface selected from a keyboard, a keypad and a signature block.

19. A mobile computing device, comprising:
a processor configured with processor-executable instructions to perform operations comprising:
determining a feature that is to be observed in the mobile computing device in order to identify a suspicious mobile device behavior, and
adaptively observing the determined feature in the mobile computing device by collecting behavior information from an instrumented component that is associated with the determined feature;
generating a vector data structure that describes the collected behavior information via a plurality of numbers; and
performing behavior analysis operations that include applying a classifier model that includes decision nodes to the vector data structure to identify the suspicious mobile device behavior.

20. A non-transitory processor-readable storage medium having stored thereon processor-executable instructions configured to cause a processor of a mobile computing device to perform operations comprising:
determining a feature that is to be observed in the mobile computing device in order to identify a suspicious mobile device behavior, and
adaptively observing the determined feature in the mobile computing device by collecting behavior information from an instrumented component that is associated with the determined feature;
generating a vector data structure that describes the collected behavior information via a plurality of numbers; and
performing behavior analysis operations that include applying a classifier model that includes decision nodes to the vector data structure to identify the suspicious mobile device behavior.

* * * * *